(12) United States Patent
Zhang et al.

(10) Patent No.: US 8,713,710 B2
(45) Date of Patent: Apr. 29, 2014

(54) CANTILEVER OF SCANNING PROBE MICROSCOPE AND METHOD FOR MANUFACTURING THE SAME, METHOD FOR INSPECTING THERMAL ASSIST TYPE MAGNETIC HEAD DEVICE AND ITS APPARATUS

(71) Applicant: Hitachi High-Technologies Corporation, Tokyo (JP)

(72) Inventors: Kaifeng Zhang, Yokohama (JP); Takenori Hirose, Tokyo (JP); Masahiro Watanabe, Yokohama (JP); Tsuneo Nakagomi, Ashigarakami-gun (JP); Shinji Honma, Ashigarakami-gun (JP); Teruaki Tokutomi, Ashigarakami-gun (JP); Toshihiko Nakata, Hiraduka (JP); Takehiro Tatizaki, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/650,985

(22) Filed: Oct. 12, 2012

(65) Prior Publication Data
US 2013/0097739 A1    Apr. 18, 2013

(30) Foreign Application Priority Data

Oct. 13, 2011  (JP) .................................. 2011-225619
May 22, 2012   (JP) .................................. 2012-116361

(51) Int. Cl.
*G01Q 60/56* (2010.01)
*G01Q 60/50* (2010.01)
*G01Q 60/06* (2010.01)

(52) U.S. Cl.
CPC ................ *G01Q 60/56* (2013.01); *G01Q 60/50* (2013.01); *G01Q 60/06* (2013.01)
USPC .................................. 850/49; 850/46; 850/24

(58) Field of Classification Search
USPC ........................ 850/49, 46, 24, 25, 6
See application file for complete search history.

(56) References Cited

U.S. PATENT DOCUMENTS

| | | | |
|---|---|---|---|
| 8,359,661 B2 * | 1/2013 | Tachizaki et al. | 850/47 |
| 2010/0061002 A1 | 3/2010 | Nakagomi et al. | |
| 2010/0195239 A1 | 8/2010 | Takayama et al. | |
| 2011/0122735 A1 | 5/2011 | Kato et al. | |

FOREIGN PATENT DOCUMENTS

| | | |
|---|---|---|
| JP | 2009-230845 A | 10/2009 |
| JP | 2010-182394 A | 8/2010 |
| JP | 2011-86362 A | 4/2011 |
| JP | 2011-113595 A | 6/2011 |

* cited by examiner

*Primary Examiner* — Kiet T Nguyen
(74) *Attorney, Agent, or Firm* — Crowell & Moring LLP

(57) ABSTRACT

To detect both of near-field light and magnetic field generated by a thermal assist type magnetic head and to perform inspection of the head, a cantilever of a scanning probe microscope has a lever in which a probe is formed, a thin magnetic film formed on a surface of the probe, and fine particles or thin film of noble metal or an alloy including noble metal formed on a surface of the magnetic film. An inspection apparatus has the cantilever, a displacement detection unit to detect vibration of the cantilever, a near-field light detection unit to detect scattered light caused by near-field light generated from a near-field light emitter and enhanced on the surface of the probe of the cantilever, and a processing unit to process signals obtained by detection with the displacement detection unit and the near-field light detection unit.

14 Claims, 13 Drawing Sheets

CANTILEVER OF SCANNING PROBE MICROSCOPE AND METHOD FOR MANUFACTURING THE SAME, METHOD FOR INSPECTING THERMAL ASSIST TYPE MAGNETIC HEAD DEVICE AND ITS APPARATUS

BACKGROUND

The present invention relates to a cantilever of a scanning probe microscope capable of detecting both of near-field light and magnetic field and a manufacturing method therefore, and a thermal assist type magnetic head device inspection method and an apparatus for inspecting a thin-film thermal assist type magnetic head device by detecting near-field light and micro-scale magnetic field using the scanning probe microscope.

As a next-generation hard disk magnetic head, a thermal assist type magnetic head device disclosed in Japanese Patent Application Laid-open publication Nos. 2010-182394, 2011-86362 and 2011-113595, is studied, near-field light generated from the thermal assist type magnetic head device is within a range of 20 nm or narrower width from the head device. This width determines a write track width of a hard disk. An inspection method for the intensity distribution of the near-field light, the surface shape of a light emitting member, and the positional relation between the near-field light and the write magnetic field, upon actual operation, is an unsolved important problem.

On the other hand, based on a scanning probe microscope (SPM) inspection technique using a cantilever having a magnetic probe, a method for inspecting a write magnetic field of a thin-film magnetic head device in a raw-bar state is disclosed in Japanese Patent Application Laid-open. Publication No. 2009-230845.

In the method disclosed in Japanese Patent Application Laid-Open Publication No. 2009-230845, it is possible to measure only the track width of the write magnetic field of the magnetic head device. However, there is no consideration of inspection of near-field light generated by a thermal assist type magnetic head device as a next-generation hard disk magnetic head device, or the surface shape of a near-field light emitter, the positional relation between the near-field light emitter and a write magnetic field generator, and the like.

Further, Japanese Patent Application Laid-open Publication No. 2009-230845 discloses inspecting the performance of the magnetic head device in a raw-bar state cut oat from a wafer. It is desired to handle the occurrence of fault in the thermal assist type magnetic head device upstream of the manufacture process and to prevent frequent occurrence of defective products by performing inspection at an early stage of head manufacturing, i.e., in raw-bar state, with respect to the thermal assist type magnetic head device.

SUMMARY

The present invention has been made in consideration of the above-described situation, and provides a cantilever of a scanning probe microscope capable of inspecting near-field light generated with a thermal assist type magnetic head device or the surface shape of a magnetic field light emitter, the positional relation between the near-field light emitter and a write magnetic field generator and the like, at a stage as early as possible in the middle of manufacturing process or in an assembled state as a magnetic head slider, and a manufacturing method thereof, and a thermal assist type magnetic head device inspection method and apparatus.

To address the above-described object, the present invention provides a structure where a cantilever of a scanning probe microscope for detecting a magnetic field of the surface of a sample has a lever formed of a plate member and a probe formed at an end of the lever, and a magnetic film is formed on the surface of the probe, further, fine particles or thin film of noble metal or an alloy including noble metal is formed on the surface of the magnetic film.

Further, to address the above-described object, the present invention provides a structure where a cantilever of a scanning probe microscope for detecting a magnetic field of the surface of a sample has a lever formed of a plate member and a probe formed at an end of the lever, and a magnetic film is formed on the surface of the probe, further, fine particles or thin film, of a material to convert incident light wavelength and emit the light is further formed on the surface of the magnetic film.

Further, to address the above-described object, the present invention provides a method for manufacturing a cantilever of a scanning probe microscope for detecting a magnetic field of the surface of a sample, where a thin magnetic film is formed on the surface of a probe formed at an end of a lever formed of a plate type member, and fine particles or thin film, of noble metal or an alloy including noble metal is formed on the surface of the magnetic film formed on the surface of the probe.

Further, to address the above-described object, the present invention provides a method for manufacturing a cantilever of a scanning probe microscope for detecting a magnetic field of the surface of a sample, where a thin magnetic film is formed on the surface of a probe formed at an end of a lever formed of a plate type member, and fine particles or thin film of a material to convert incident light wavelength and emit the light is further formed on the surface of the magnetic film, formed on the surface of the probe.

Further, to address the above-described object, the present invention provides an inspection apparatus for inspecting a thermal assist type magnetic head device, including: a table unit that is movable in a plane while carrying the thermal assist type magnetic head device as a sample; a cantilever, having a probe, the surface of which a magnetic film is formed, to scan the surface of the sample placed on the table unit; a vibration drive unit that vibrates the cantilever in a vertical direction with respect to the surface of the sample; a displacement detection unit that emits light on a surface of the cantilever, vibrated with the vibration drive unit, opposite to a side where the probe is formed, to detect reflection light from the cantilever, so as to detect vibration of the cantilever; a signal output unit that outputs a signal to generate an alternating current magnetic field from a magnetic field generator of the thermal assist type magnetic head device and to generate near-field light from a near-field light emitter; a scattered light detection unit that detects scattered light generated from the surface of the probe of the cantilever, on which the magnetic film is formed, with the near-field light generated from the near-field light emitter of the thermal assist type magnetic head device with the signal outputted from the signal output unit; and a processing unit that processes the signal obtained by detection with the displacement detection unit and the signal obtained by detection of the scattered light with the scattered light detection unit, and inspects at least one of the intensity distribution of the near-field light generated from the near-field light emitter of the thermal assist type magnetic head device, the surface shape of the near-field light emitter, and the positional relation between the magnetic field generator and the near-field light emitter.

Further, to address the above-described object, the present invention provides an inspection apparatus for inspecting a thermal assist type magnetic head device, including: a table unit carrying the thermal assist type magnetic head device as a sample that is movable in a plane; a cantilever having a probe, the surface of which a magnetic film is formed, to scan the surface of the sample placed on the table unit; a vibration drive unit that vibrates the cantilever in a vertical direction with respect to the surface of the sample; a displacement detection unit that emits light on a surface of the cantilever, vibrated with the vibration drive unit, opposite to a side where the probe is formed, to detect reflection light from the cantilever, so as to detect vibration of the cantilever; a signal output unit that outputs a signal to generate an alternating current, magnetic field from a magnetic field generator of the sample; a laser emission unit that emits laser on the cantilever; a scattered light detection unit that detects scattered light generated from, the surface of the sample with the near-field light generated from the probe of the cantilever on which the laser is emitted with the laser emission unit; and a processing unit that processes the signal obtained by detection with the displacement detection unit and the signal obtained by detection of the scattered light generated from the surface of the sample with the scattered light detection unit, and inspects at least one of the surface shape of the sample which generated the scattered light and the positional relation between, the magnetic field generator and the near-field light emitter.

Further, to address the above-described object, the present invention provides a method for inspecting a thermal assist type magnetic head device including: placing the thermal assist type magnetic head device as a sample on a table that is movable in a plane of a scanning probe microscope apparatus; generating an alternating current magnetic field from a magnetic field generator of the sample and generating near-field light from a near-field light emitter; detecting the alternating current magnetic field generated from the thermal assist type magnetic head device and scattered light from the near-field light by moving the table in the plane in a state where the cantilever of the scanning probe microscope, having a probe the surface of which a magnetic film is formed, is vibrated vertically in the close vicinity of the surface of the sample; and inspecting at least one of the intensity distribution of the near-field light emitted from the near-field light emitter of the thermal assist type magnetic head device formed in the raw-bar, the surface shape of the near-field light emitter and the positional relation between the magnetic field generator and the near-field light emitter, using occurrence position information of the detected alternating current magnetic field and occurrence position information of the near-field light based on the detected scattered light.

Further, to address the above-described object, the present invention provides a method for inspecting a thermal assist type magnetic head device, including: placing the thermal assist type magnetic head device as a sample on a table that is movable in a plane of a scanning probe microscope apparatus; generating an alternating current magnetic field from a magnetic field generator of the sample said emitting laser on a cantilever of the scanning probe microscope apparatus having a probe the surface of which a magnetic film is formed to generate near-field light from the probe; detecting the alternating current magnetic field generated from the thermal assist type magnetic head device by moving the table in the plane in a state where the cantilever is vertically vibrated in the close vicinity of the surface of the sample and detecting scattered light generated from the thermal assist type magnetic head device in the close vicinity of the generated near-field light; and inspecting the surface shapes of the magnetic field generator and the near-field light emitter of the sample and the positional relation between the magnetic field generator and the near-field light emitter using occurrence position information of the detected alternating current magnetic field and detection information of the scattered light generated with the near-field light.

According to the present invention, it is possible to provide a cantilever capable of detecting both near-field light and a magnetic field and a scanning probe microscope having the cantilever.

Further, according to the present invention, it is possible to perform non-destructive inspection on a write magnetic field generated with a thermal assist type magnetic head device, the intensity distribution of thermal assist light (near-field light) or the surface shapes of a magnetic field generator and a near-field light generator, the positional relation between the near-field light emitter and the write magnetic field generator, and the like, at a stage as early as possible in the middle of manufacturing process.

These features and advantages of the invention will be apparent from the following more particular description of preferred embodiments of the invention, as illustrated in the accompanying drawings.

BRIEF DESCRIPTION OF THE DRAWINGS

The above and other object, features and advantages of the present invention will become more apparent, from the following detailed description when taken in conjunction with the accompanying drawings wherein.

DESCRIPTION OF THE PREFERRED EMBODIMENTS

Figure 1A:
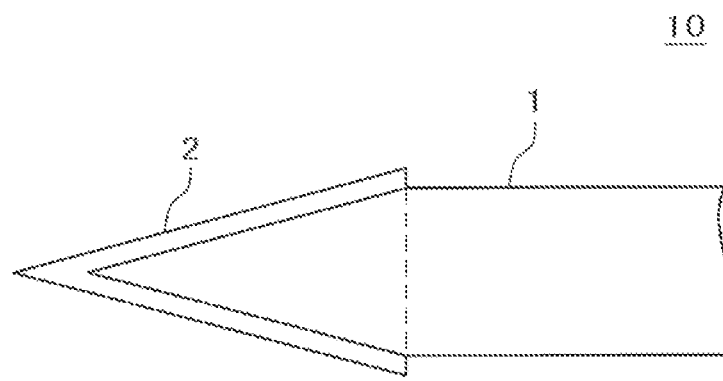
FIG. 1A is a plan view showing a schematic structure of a cantilever capable of detecting both of near-field light and magnetic field according to a first embodiment of the present invention.

Hereinafter, preferred embodiments of the present invention will now be described in detail in accordance with the accompanying drawings. Note that in all the figures for explaining the embodiments, the same member has the same reference numeral in principle, and the repeated explanation will be omitted.

First Embodiment

A schematic structure of a cantilever 10 capable of detecting both of near-field light (Evanescent light) and magnetic field according to a first embodiment of the present invention will be described with reference to FIGS. 1A and 1B. FIG. 1A is a plan view showing a schematic structure of the cantilever 10 capable of detecting both of near-field light and magnetic field according to the present embodiment, and FIG. 1B, a side view of the cantilever.

Figure 1B:
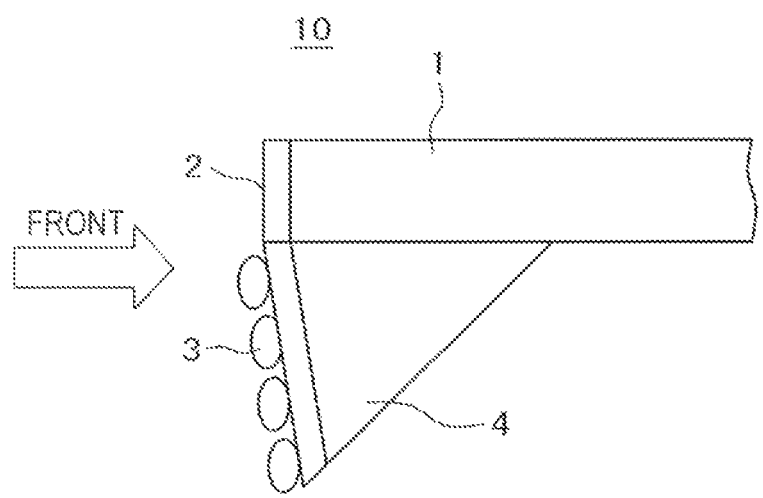
FIG. 1B is a side view showing a schematic structure of the cantilever capable of detecting both of near-field light and magnetic field according to the first embodiment of the present invention.

In FIGS. 1A and 1B, the cantilever 10 capable of detecting both of near-field light and magnetic field has a tetrahedral-structured probe 4 at the end of a plate type lever 1. The lever 1 and the probe 4 are formed of silicone (Si). A thin magnetic film 2 (e.g., Co, Ni, Fe, NiFe, CoFe or NiCo) is formed the front side of the lever 1 and the probe 4. Fine particles or thin film 3 of noble metal (e.g., gold, silver or platinum) or an alloy including noble metal is formed on the surface of the magnetic film 2. The cantilever 10, having the lever 1, the probe 4, the thin magnetic film 2, and the fine particles or thin film 3 of noble metal, is capable of detecting both of near-field light and magnetic field.

The roles of the respective elements of the cantilever 10 capable of detecting both of near-field light and magnetic field in the present embodiment are as follows.

The cantilever 10 capable of detecting both of near-field light and magnetic field has a similar shape as a cantilever structure as that in a general scanning probe microscope. In the present embodiment, to measure both of near-field light and magnetic field, the thin magnetic film 2, formed on the surface of the probe 4 at the end of the lever 1 of the cantilever 10, determines sensibility and resolution, upon detection of magnetic field by sensing the magnetic field of the detection subject upon detection of magnetic field. Further, the fine particles or thin, film 3 of noble metal (e.g., gold, silver or platinum) or the alloy including the noble metal generates scattered light enhanced by localized surface plasmon enhancement effect when the probe 4 is positioned within a near-field light generation region. Further, when laser is emitted from the outside, the fine particles or thin film 3 is excited, and emits near-field light.

Next, a method for manufacturing the cantilever 10 according to the first embodiment of the present invention, capable of detecting both of near-field light and magnetic field, will be described with reference to FIGS. 2A to 2C.

Figure 2A:
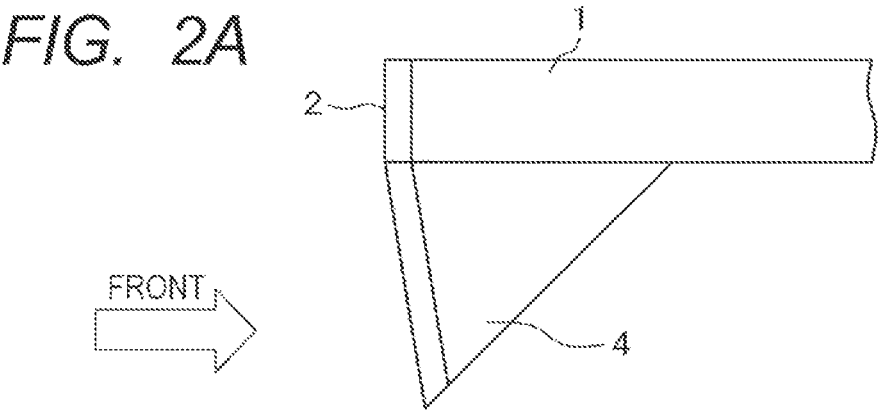
FIG. 2A is a side view of the cantilever in a state where a thin magnetic film is formed on the front surfaces of the cantilever and a probe, explaining a method for manufacturing the cantilever capable of detecting both of near-field light and magnetic field according to the first embodiment of the present invention.

First, as shown in FIG. 2A, the lever 1 is formed and the probe 4 having a tetrahedral-structure is formed at the end of the lever 1. Next, the lever 1 and the probe 4 are coated with the magnetic film 2 from the front side of the probe 4. As a unit to perform coating with the magnetic film 2, a vacuum evaporation device or a sputtering device may be used. The amount of formation of the magnetic film is determined based on magnetic field intensity and size of an actual detection subject; in general, it is 10 nm to 40 nm. As the material of the magnetic body, a soft magnetic material such as Ni, Fe, NiFe, CoFe or NiCo, or a hard magnetic material such as Co, Al—Ni—Co or Fe—Pt may be selected according to detection, purpose.

Figure 2B:
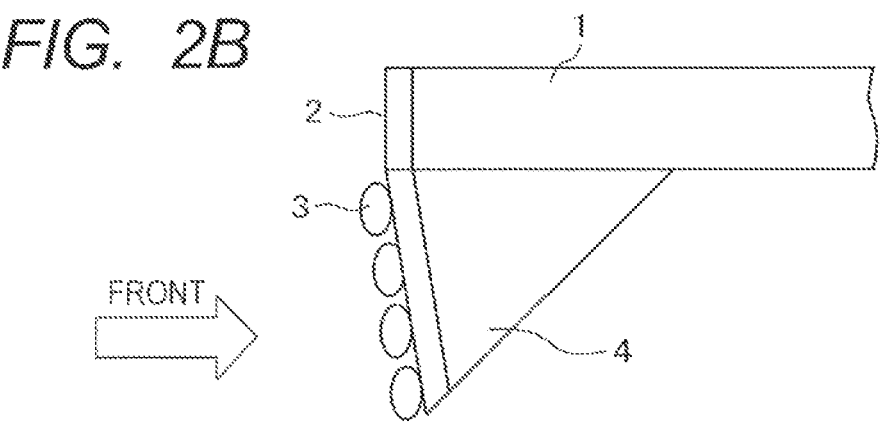
FIG. 2B is a side view of the cantilever in a state where fine particles of noble metal are attached to the thin magnetic film formed on the front surfaces of the cantilever and the probe, explaining the method for manufacturing the cantilever capable of detecting both of near-field light and magnetic field according to the first embodiment of the present invention.

Next, as shown in FIG. 2B, the fine particles or thin film 3 of noble metal (e.g., gold, silver or platinum) or the alloy including noble metal is formed on the surface of the probe 4, coated with the magnetic film 2, from the front side, thus the cantilever 10 capable of detecting both of near-field light and magnetic field is completed. The material of the fine particles or thin film 3 is Au, Pt, Cu, Ag or the like, or noble metal or an alloy including noble metal. The film, thickness of the thin film is 1 to 20 nm.

Figure 2C:
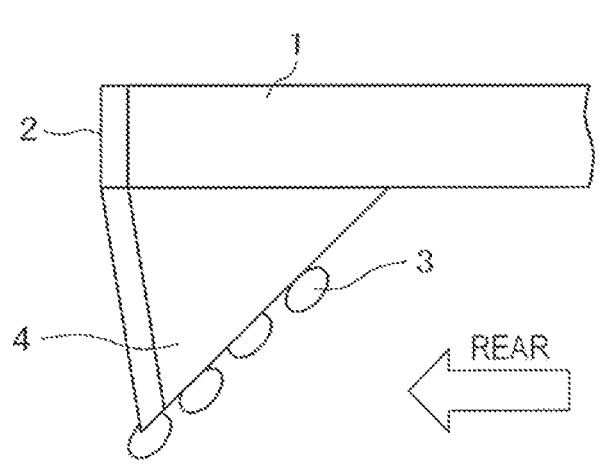
FIG. 2C is a side view of the cantilever in a state where the fine particles of noble metal are attached to a rear surface side, different from the surfaces of the cantilever and the probe where the thin magnetic film is formed, explaining the method for manufacturing the cantilever capable of detecting both of near-field light and magnetic field according to the first embodiment of the present invention.

As shown as a cantilever 10' in FIG. 2C, it is possible to add a surface on which the fine particles or thin film 3 is formed, at a certain angle, from diagonally rear two directions. Also in this case, the material of the fine particles or thin film 3 is Au, Pt, Cu or Ag or the like, or an alloy material including noble metal. When the thin film is formed of the alloy material, the film thickness is 1 to 20 nm. When the thin film is formed of the fine particles, the diameter is 4 to 20 nm.

Figure 3A:
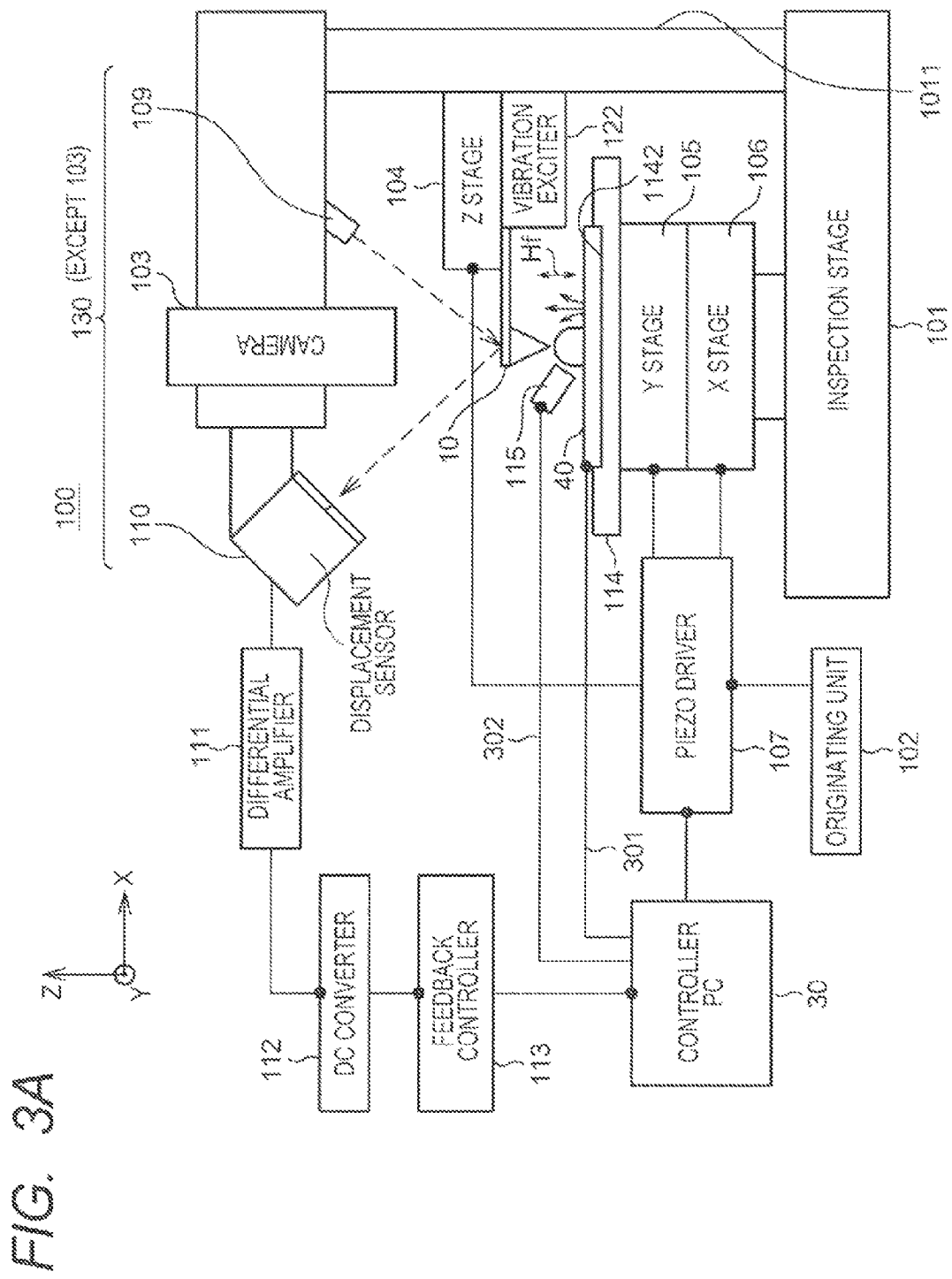
FIG. 3A is a block diagram showing a schematic configuration of a thermal assist type magnetic head device inspection apparatus according to the first embodiment of the present invention.

FIG. 3A shows a basic configuration of the thermal assist type magnetic head device inspection apparatus 100 according to the first embodiment of the present invention. The thermal assist type magnetic head device inspection, apparatus 100 in FIG. 3A is capable of detecting the intensity distribution of near-field light generated with the thermal assist type magnetic head device in a state of the raw-bar 40 (a block where head sliders are arrayed) at a step before processing of a wafer, in which a large number of thin film magnetic head devices are formed, and cutting of each slider unit from the wafer, in the magnetic head device manufacturing process. Generally, the raw-bar 40, as an about 3 to 10 cm strip block body cut out from a wafer where a large number of thin film magnetic head devices are formed, cut out from the wafer, has a structure where about 40 to 90 head sliders (thin film magnetic head devices) are arrayed.

The thermal assist type magnetic head device inspection apparatus 100 according to the present embodiment performs predetermined inspection on the raw-bar 40 as a work. Generally about 20 to 30 raw-bars 40 are arrayed and contained at a predetermined interval, in a short axis direction in a tray (not shown). The raw-bars 40 are picked up one by one using a handling robot (not shown) from the tray (not shown), and conveyed to the inspection stage 101. The raw-bar 40 conveyed onto the inspection stage 101 is inspected as described later.

The thermal assist type magnetic head device inspection apparatus 100 according to the present embodiment is a scanning probe microscope as a base. The inspection stage 101 of the thermal assist type magnetic head device inspection apparatus 100 has X stage 106 and Y stage 105 capable of moving the raw-bar 40 in X and Y directions.

Figure 3B:
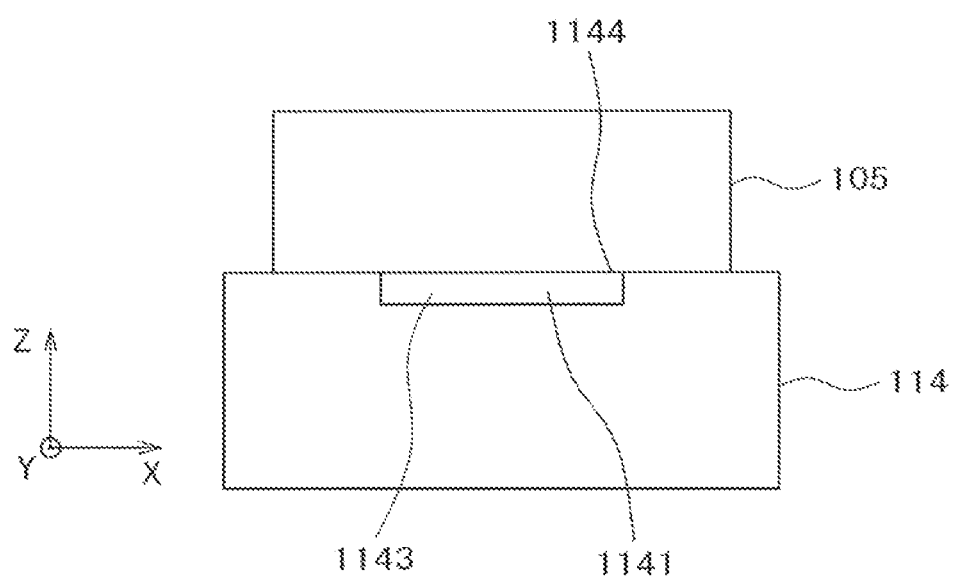
FIG. 3B is a plan view of a Y stage and a positioning stage of the thermal assist type magnetic head device inspection apparatus according to the first embodiment of the present invention in a state where a raw-bar is not placed.

The raw-bar 40 is positioned in the Y direction when a side surface in its longitudinal direction is temporarily brought to abut against a reference surface 1141 (step surface formed in the Y stage 105) of the stage 114 for positioning the raw-bar 40 provided on the upper surface of the Y stage 105. A step member 1142 having a shape approximately corresponding to the shape of the raw-bar 40 is provided on the stage 114. The raw-bar 40 is brought to abut against a bottom surface 1143 and a side surface 1144 of the step member 1142, as shown in FIG. 3B (a plane view of the Y stage 105 and the stage 114 for positioning in a state where the raw-bar 40 is not placed), thus it is set in a predetermined position in Z and X directions.

A rear side surface of the raw-bar 40 (a surface opposite to the surface where respective connection terminals of the thermal assist type magnetic head device are formed) abuts against a rear surface of the step member (reference surface 1141). Each of the abutment surfaces 1143 and 1144 is parallel to a moving direction of the X stage 106 (X axis) or a moving direction of the Z stage 104 (Z axis) respectively and orthogonal to each other, the positioning in the X direction and the Z direction are performed by bringing the raw-bar 40 to abut against the bottom surface 1143 and the side surface 1144 of the step member 1142 of the Y stage 105.

A camera 103 for detecting positional shift amount of the raw-bar 40 is provided above the Y stage 105. The Z stage 104 is fixed to a column 1011 of the inspection stage 101, to move the cantilever 10 in the Z direction. The X stage 106, the Y stage 105 and the Z stage 104 of the inspection stage 101 respectively have a piezo stage driven with a piezo device (not shown). When predetermined positioning of the raw-bar 40 has been completed, excitation signal and light emission signal outputted from the controller PC 30 is supplied to the raw-bar 40 or excitation laser 301 is directly supplied to the raw-bar 40. The raw-bar 40 is absorbed and held on the stage 114 by adsorption unit (not shown) provided on the Y stage 105, in a state where the write field generator (magnetic field generator) 402 of the thermal, assist type magnetic head device is capable of generating a magnetic field and the near-field light emitter 404 is capable of emitting light.

The piezo driver 107 drives and controls piezo devices (not shown) to drive the respective X stage 106, the Y stage 105 and the Z stage 104 of the inspection stage 101. The controller PC 30 is a control computer basically consisting of a personal computer (PC) including a monitor. As shown in the figure, the cantilever 10 capable of detecting both of the above-described near-field light and magnetic field, is provided in a position above the raw-bar 40 placed on the Y stage 105 of the inspection stage 101. The cantilever 10 is attached to the vibration exciter 122 provided in a lower side of the Z stage 104. The vibration exciter 122 has a piezo device. An alternating current voltage at a frequency around a mechanical resonance frequency is applied by an excitation voltage from the piezo driver 107, and the probe 4 at the end of the cantilever 10 is vibrated in a vertical direction (the Z direction).

The Z-directional vibration of the probe 4 at the end of the cantilever 10 is detected with a displacement detector 130 having a semiconductor laser device 109 and a displacement sensor 110 having a 4-division sensor. In this displacement detector 130, laser output from the semiconductor laser device 109 is emitted on a surface of the cantilever 10 opposite to the surface where the probe 4 is formed, and the laser reflected from the cantilever 10 enters the displacement sensor 110.

The displacement sensor 110 is a 4-division sensor where its photoreception surface is divided in 4 regions. The laser, incident on each of the divided photoreception surfaces of the displacement sensor 110, is photoelectric-converted, and the laser is outputted from the displacement sensor 110 as four electric signals. Note that the displacement sensor 110 is set in a position where the reflected light from the cantilever 10 is equally incident on the divided four photoreception surfaces when the laser is emitted from the semiconductor laser device 109 to the cantilever 10 while the displacement sensor 110 is not excited with the vibration exciter 122, i.e., in a stationary state.

The differential amplifier 111 performs predetermined operation processing on a differential signal of the four electric signals outputted from the displacement sensor 110 and outputs the processed signal to the DC converter 112. That is, the differential amplifier 111 outputs a displacement signal, corresponding to the difference among the four electric signals outputted from the displacement sensor 110, to the DC converter 112. Accordingly, in a state where the cantilever 10 is not excited with the vibration exciter 122, the output from the differential amplifier 111 is zero. The DC converter 112 has an RMS-DC converter (Root Mean Squared value to Direct Current converter) to convert a displacement signal outputted from the differential amplifier 111 to a direct current signal as an effective value.

The displacement signal outputted from the differential amplifier 111 is a signal corresponding to the displacement of the cantilever 10, and since the cantilever 10 is vibrated, it is an alternating current signal. The signal outputted from the DC converter 112 is outputted to the feedback controller 113. The feedback controller 113 outputs, as a signal for monitoring the current amplitude of the vibration of the cantilever 10, the signal outputted from the DC converter 112 to the controller PC 30, and as a control signal for the Z stage 104 to control the amplitude of the excitation of the cantilever 10, outputs the signal outputted from the DC converter 112 through the controller PC 30 to the piezo driver 107. The initial position of the cantilever 10 is adjusted prior to the start of detection by monitoring this signal with the controller PC 30 and controlling the piezo device (not shown) to control the Z stage 104 with the piezo driver 107 in accordance with the signal value.

In the present embodiment, the head floating height of the hard disk drive is set as the initial position of the cantilever 10. The oscillator 102 supplies an oscillation signal to excite the cantilever 10 to the piezo driver 107. The piezo driver 107 drives the vibration exciter 122 based on the oscillation signal from the originating unit 102 to vibrate the cantilever 10 at a predetermined frequency.

Figure 4A:
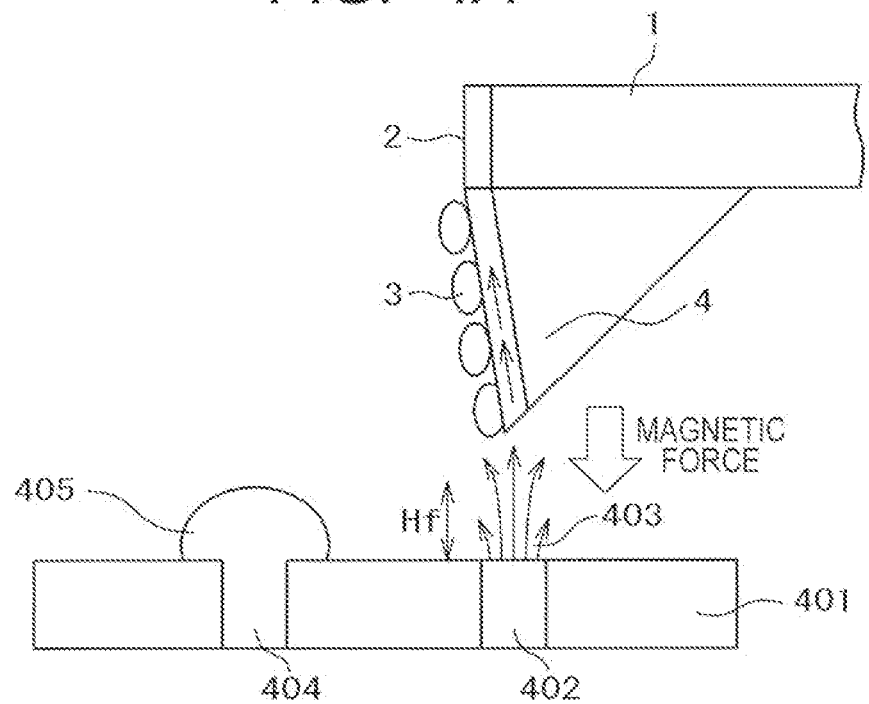
FIG. 4A is a cross-sectional side view of the cantilever and the raw-bar in a state where a magnetic field generated with the thermal assist type magnetic head device formed in the raw-bar is measured, explaining the detection principle of the thermal assist type magnetic head device inspection apparatus according to the first embodiment of the present invention.
Figure 4B:
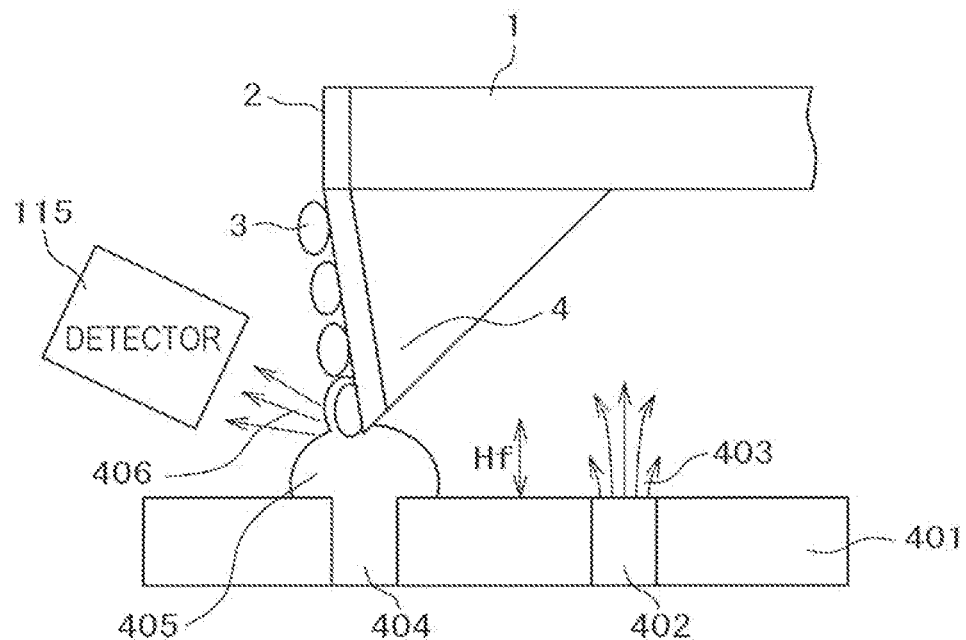
FIG. 4B is a cross-sectional side view of the cantilever, a detector and the raw-bar in a state where near-field light generated with the thermal assist type magnetic head device formed in the raw-bar is measured, explaining the detection principle of the thermal assist type magnetic head device inspection apparatus according to the first embodiment of the present invention.

FIGS. 4A and 4B schematically show the principle of detection of magnetic field and near-field light with the thermal assist type magnetic head device inspection apparatus 100 shown in FIG. 3A, and show enlarged view of the structures of the write field generator 402 and the thermal assist light (near-field light) generator 404 of the thermal assist type magnetic head device 401 formed in the raw-bar 40, together with the cantilever 10.

As shown in FIG. 4A, the cantilever 10 is positioned with the Z stage 104 such that, up to a position (height) several 10s nm away from a state where an undermost point Hf upon vibration is in contact with the surface of the thermal assist type magnetic head device 401 formed in the raw-bar 40, the end 41 of the probe 4 of the cantilever 10, where the magnetic film 2 and the fine particles or thin film 3 of noble metal (e.g. gold, silver or platinum) or the alloy including noble metal are formed, is positioned, at a height where a magnetic field signal and a near-field light detection signal from the thermal assist type magnetic head device 401 are maximum, and detected at high resolution. The cantilever 10 is scanned within a range of several 100s nm to several μm in a plane parallel to the recording surface 410 of the head of the raw-bar 40.

In the present embodiment, the raw-bar 40 is moved with the X stage 106 and the Y stage 107. At this time, the thermal assist type magnetic head device 401 is supplied with the excitation signal and light emission signal 301 outputted from the controller PC 30 shown in FIG. 3A or directly supplied with excitation laser, and the write field generator 402 of thermal assist type magnetic head device 401 generates a write magnetic field (alternating current magnetic field) 403, and the near-field light emitter 404 emits thermal assist light (near-field light) 405.

When the probe 4 of the cantilever 10, the surface of which the magnetic body 2 and fine particles or thin film 3 of noble metal (e.g. gold, silver or platinum) or the alloy including noble metal are formed, enters the write magnetic field 403 generated by the write field generator 402 by moving the X stage 106, on which the raw-bar 40 is placed, with the piezo device (not shown) controlled with the piezo driver 107 at a constant speed in the X direction, in a state where vibration is applied with the vibration exciter 122 to the cantilever 10, the thin-film magnetic body 2 formed on the surface of the probe 4 is magnetized, then the probe 4 receives a magnetic force, and the vibration state of the cantilever 10 is changed.

The change of vibration is detected with the displacement sensor 110 in FIG. 3A. That is, when the vibration state of the cantilever 10 is changed, the incident positions of the laser emitted from the semiconductor laser device 109 and reflected with the cantilever 10 on the divided four photoreception surfaces of the displacement sensor 110 are changed. It is possible to detect the change of vibration state of the cantilever 10 by detecting the output from the displacement sensor 110 with the differential amplifier 111. As a result, it is possible to detect the intensity distribution of the write magnetic field 403 generated by the magnetic field generator (write field generator) 402 of the thermal assist type magnetic head device 401.

On the other hand, as shown in FIG. 4B, when the probe 4 enters a region where the near-field light 405 is generated by the near-field light emitter 404 by moving the X stage 106, on which the raw-bar 40 is placed, at a constant speed in the X direction in a state where vibration in the vertical direction with respect to the surface 410 of the raw-bar 40 is applied with the vibration exciter 122 to the cantilever 10, scattered light 406, generated from the probe 4 placing in the region where the near-field light 405 is generated, is enhanced by the localized surface plasmon enhancement effect, with the fine particles or thin film 3 of noble metal (e.g. gold, silver or platinum) or the alloy including noble metal formed on the magnetic film 3 on the surface of the probe 4. The enhanced scattered light 406 is detected with the photo detector 115 placed in the close vicinity of the cantilever 10.

In this manner, it is possible to defect the near-field light, which is generated only in the region in the close vicinity of the near-field light emitter 404, in a place comparatively away from, the near-field light emitter 404 and outside of the near-field light generated region. Further, if is possible to measure the positional relation between the write magnetic field (alternating current magnetic field) 403 generated with the magnetic field-generator 402 of the thermal assist type magnetic head device 401 and the thermal assist light (near-field light) 405 generated by the near-field light emitter 404.

It is advantageous that it is possible to perform inspection, of the write magnetic field and the intensity distribution of the near-field light in the thermal assist type magnetic head device and measurement of the positional relationship therebetween at a stage as early as possible in the middle of manufacturing process.

Figure 5:
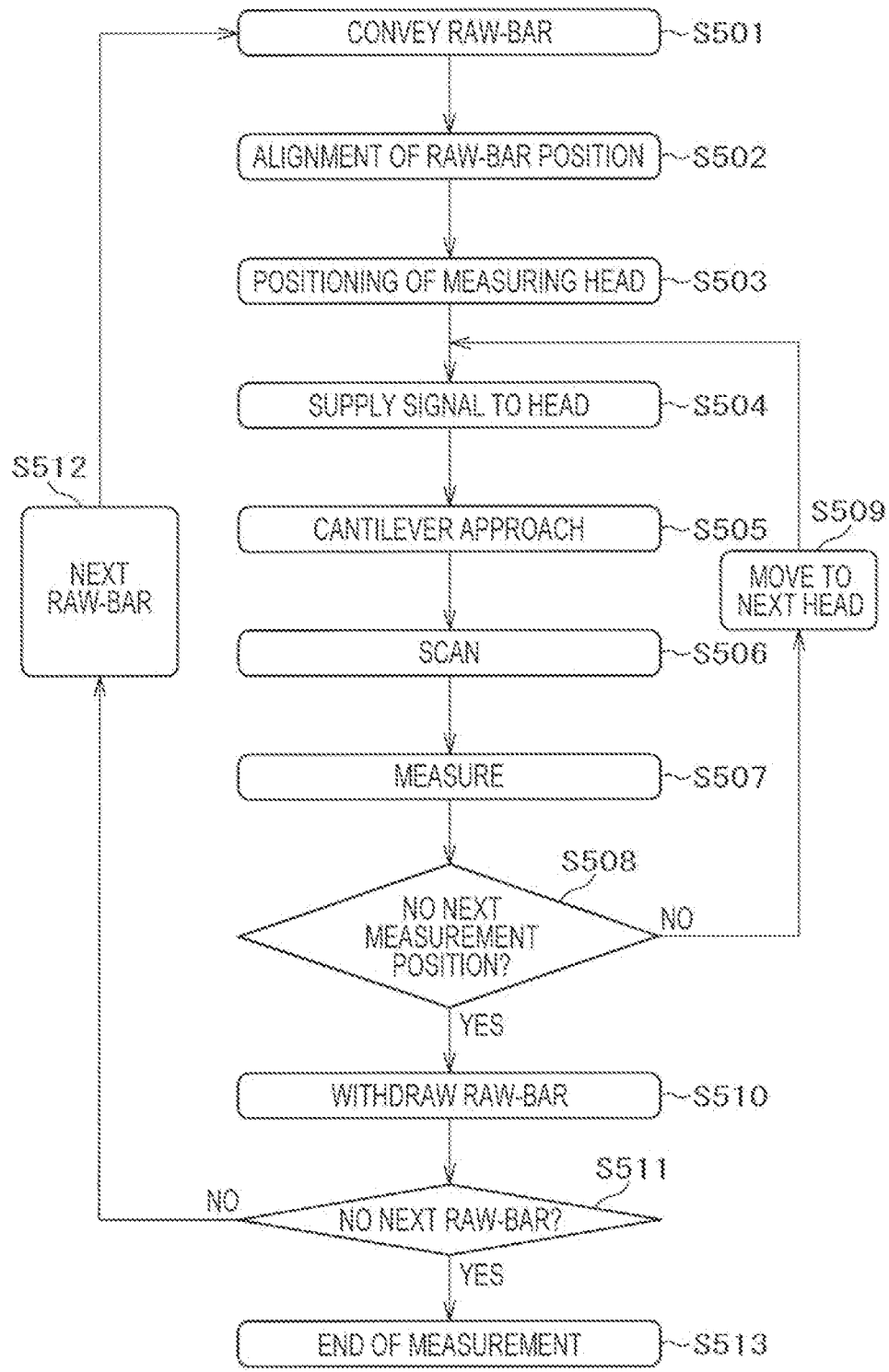
FIG. 5 is a flowchart showing a procedure of inspection of the thermal assist type magnetic head device using the thermal assist type magnetic head device inspection apparatus according to the first embodiment and a second embodiment of the present invention.

FIG. 5 is a flowchart showing a procedure of the operation to inspect the raw-bar 40 using the above-described thermal assist type magnetic head device inspection apparatus 100.

First, one raw-bar 40 is picked up with the handling unit (not shown) from the supply tray, then is conveyed onto the inspection stage 101, and in a state where the raw-bar 40 is pressed against the reference surface 1141 of the Y stage 105, the raw-bar 40 is placed on the step member 1142 formed with the Y stage 105 (S501). Next, image sensing is performed with the camera 103 on the raw-bar 40, and positional information of the raw-bar 40 is obtained. Then based on the obtained positional information, the X stage 106 or the Y stage 105 is driven to perform, alignment to adjust the position of the raw-bar 40 (S502), and move the raw-bar 40 to a detection position (S503).

Next, the excitation signal and light emission signal 301 or directly excitation laser is supplied to the thermal assist type magnetic head device 401 (S504), to generate the write magnetic field (alternating current magnetic field) 403 from the magnetic field generator 402, and generate the optically assisted light (near-field light) 405 from the near-field light emitter 404. Next, the cantilever 10 is moved to approach the recording surface 410 of the thermal assist type magnetic head device 401 by controlling the piezo device (not shown) to drive the Z stage 104 with the piezo driver 107 (S505).

Next, the cantilever 10 is scanned within the range of several 100s nm to several μm in the plane parallel to the recording surface 410 of the thermal assist type magnetic head device 401 (S506) by vibrating the cantilever 10 with the vibration exciter 122 while the piezo device (not shown) is driven with the piezo driver 107 to move the X stage 106 in the X direction at a constant speed.

With this scanning, it is possible to detect a change of vibration of the cantilever 10 in the write magnetic field 403 generated from the magnetic field generator 402 of the thermal assist type magnetic head device 401, from an output signal of the displacement detector 130 having the semiconductor laser device 109 and the position sensor 110, and it is possible to obtain the positional information of the magnetic field generator 402 and the distribution information of the magnetic field generated with the magnetic field generator 402.

On the other hand, the near-field light 405 generated from the near-field light emitter 404 causes a scattered light on the surface of the probe 4 when the probe 4 is placed in the near-field light generated region by the scanning. And the scattered light is enhanced with the localized surface plasmon enhancement effect with the fine particles or thin film 3 of noble metal (e.g. gold, silver or platinum) or the alloy including noble metal formed on the surface of the probe 4 of the cantilever 10, and is detected with a detector 115.

A detection signal 302 from the detector 115 by the detection of the enhanced near-field light is processed with the controller PC 30, the respective intensity distributions of the optically assisted light (near-field light) 405 are obtained, and the positional information and the surface shape information of the near-field light emitter 404 are obtained. Then, from the positional information of the magnetic field generator 402 and the positional information of the near-field light emitter 404, the positional relation between the magnetic field generator 402 and the near-field light emitter 404 is measured (S507), and it is checked whether or not the space between the magnetic field generator 402 and the near-field light emitter 404 is a predetermined space.

Next, it is checked whether or not further detection position exists (S508), and when it is determined that a further detection position exists, in a state where the cantilever 10 is lifted with the Z stage 104, it is moved to the next head detection position (S509), to repeat the operations from step S504. On the other hand, when it is determined that further detection position does not exit, the detection-completed raw-bar 40 is picked up with the handling unit (not shown) in the state where the cantilever 10 is lifted with the Z stage 104, and set in the collection tray (S510).

Next, it is checked whether or not an uninspected raw-bar 40 exists on the supply tray (not shown) (S511). When it is determined that an uninspected raw-bar 40 exists, the process returns to step S501 at which the uninspected raw-bar 40 is picked up from the supply tray (not shown) (S512), then is conveyed to the inspection stage 101, and the steps from step S501 are performed. On the other hand, when it is determined that no uninspected raw-bar 40 exists, the detection is terminated (S513).

According to the present embodiment, it is possible to detect a write magnetic field (alternating current magnetic field) and thermal assist light (near-field light) generated from the thermal assist type magnetic head device 401 formed in the raw-bar 40, with the thermal assist type magnetic head device inspection apparatus 100, by scanning at once with the cantilever 10, and it is possible to perform inspection upstream of the manufacturing process and within a comparatively short period.

Note that as the probe 4, a thin wire member formed of any one of silicone, silicone oxide, silicon nitride, high density carbon (HDC:DLC), carbon nano tube (CNT), carbon nano fiber (CNF) and tungsten (W), may be used.

Further, in the above-described embodiment, the fine particles or thin film 3 of noble metal or the alloy including noble metal is formed on the magnetic film 2 formed on the front side of the probe 4. However, the present embodiment is not limited to this arrangement. For example, when the probe 4 in which the fine particles or thin film 3 is not formed but only the magnetic film 2 is formed is used, the level of the detection signal is slightly lower in comparison with the above-described embodiment, however, it is possible to detect the scattered light generated from the probe 4 with the thermal assist light (near-field light), and it is possible to detect the write magnetic field (alternating current, magnetic field) and the thermal assist light (near-field light) generated from the thermal assist type magnetic head device 401 formed in the raw-bar 40 by scanning with, the cantilever 10 at once.

Further, as described above, the magnetic film 2 is formed in a thin-film state on the surface of the probe 4; however, the probe 4 may be doped with a magnetic material.

Further, in the above embodiment, the raw-bar 40 is the inspection subject; however, the present, embodiment is not limited to this arrangement. Each of chips cut out from the raw-bar 40 (slider unit or head device unit) may be handled as an inspection subject.

Second Embodiment

Figure 6:
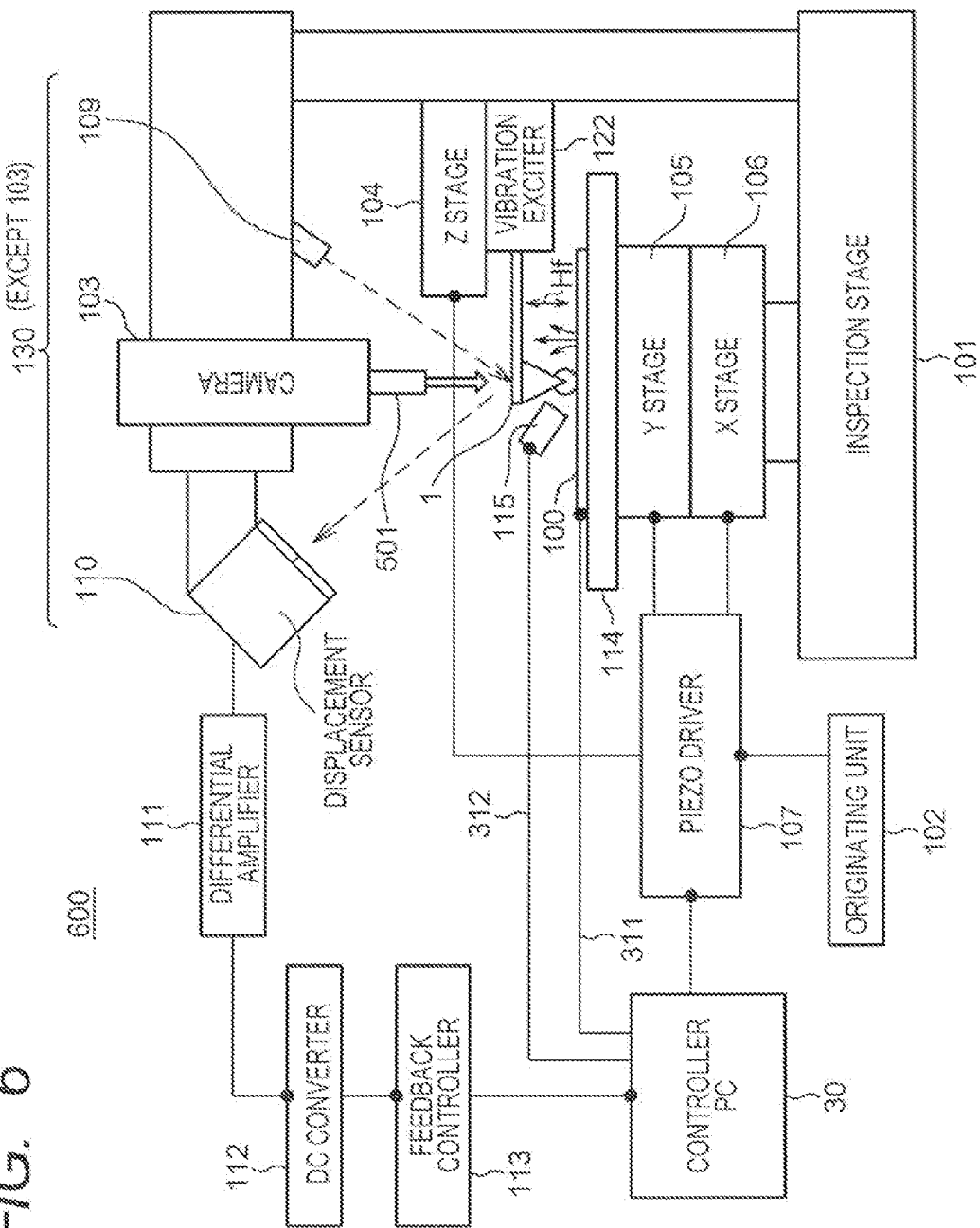
FIG. 6 is a block diagram showing a schematic configuration of the thermal assist type magnetic head device inspection apparatus according to the second embodiment.

FIG. 6 is a block diagram showing the entire configuration of a thermal assist type magnetic head device inspection apparatus 600 according to a second embodiment of the present invention. The thermal assist type magnetic head device inspection, apparatus 600 shown in FIG. 6 has basically the same structure as that of the thermal assist type magnetic head device inspection, apparatus 100 described in the first embodiment. In the configuration of the thermal assist type magnetic head device inspection apparatus 600 shown in FIG. 6, the parts corresponding to the constituent elements of the thermal assist type magnetic head device inspection apparatus 100 described in FIG. 3A have the same reference numerals.

In the second embodiment, the difference from the first embodiment is that a laser source 501 is set directly above the cantilever 10, and by emitting laser from the position above the cantilever 10 with the laser source 501, near-field light is generated with the fine particles or thin film 3 of noble metal (e.g. gold, silver or platinum) or the alloy including noble metal formed, on the surface of the probe 4, and the near-field light, scattered with the thermal assist type magnetic head device 401 formed in the raw-bar 40 is detected with a detector 515, and further, the light emission signal or laser to generate the optically assisted light (near-field light) 405 is not outputted from the controller PC 30 to the near-field light emitter 404.

Figure 7A:
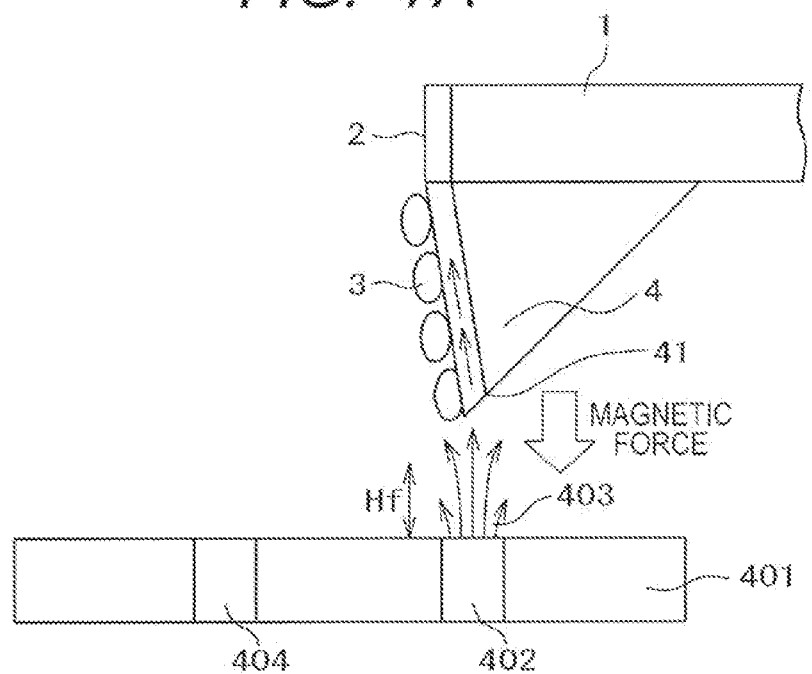
FIG. 7A is a cross-sectional side view of the cantilever and the raw-bar in a state where the magnetic field generated with the thermal assist type magnetic head device formed in the raw-bar is measured, explaining the detection principle of the thermal assist type magnetic head device inspection apparatus according to the second embodiment of the present invention.

In the second embodiment, as shown in FIG. 7A, the write magnetic field 403 is generated with the write field generator 402 of the thermal assist type magnetic head device 401 with the oscillated excitation signal 311 from the controller PC 30, and the intensity distribution of the write magnetic field 403 is measured by scanning with the cantilever 10, as described in the first, embodiment using FIG. 4A.

In this manner, by detecting the intensity distribution of the write magnetic field 403 generated with the write field generator 402, it is possible to determine the position of the write field generator 402. It is possible based on the determined positional information of the write field generator 402 to estimate the position of the near-field, light emitter 404.

Figure 7B:
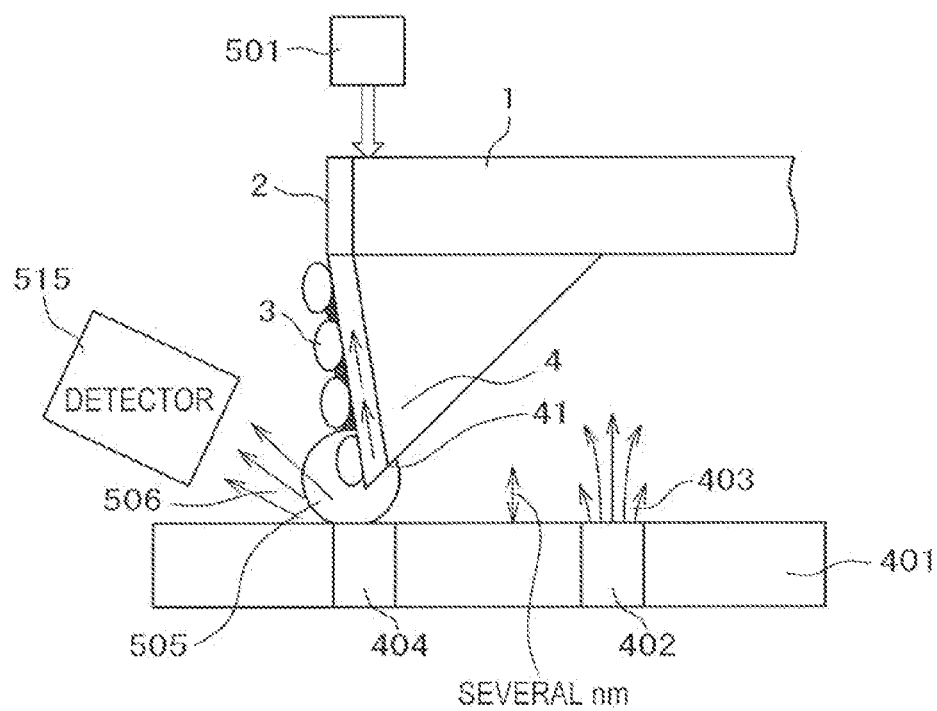
FIG. 7B is a cross-sectional side view of the cantilever and the raw-bar in a state where the near-field light generated with the thermal assist type magnetic head device formed in the raw-bar is measured, explaining the detection principle of the thermal assist type magnetic head device inspection apparatus according to the second embodiment of the present invention.

On the other hand, as shown in FIG. 7B, in the present embodiment, a signal or laser for near-field light emission as in the case of the first embodiment is not supplied from the controller PC 30 to the near-field light emitter 404. Near-field light, generated from the fine particles or thin film 3 of noble metal (e.g. gold, silver or platinum) or the alloy including noble metal formed on the thin magnetic film 2 on the surface of the probe 4, is emitted on the surface of the thermal assist type magnetic head device 401, with laser emitted from the laser source 501.

In the present embodiment, the surface states of the near-field light emitter 404 and the magnetic field generator 402 are detected in this manner. At this time, the cantilever 10 is positioned in the Z direction with the Z stage 104 such that, up to a position (height) several 10s nm away from a state where the undermost point Hf upon, vibration is in contact with the recording surface 410 of the thermal assist type magnetic head device 401 formed in the raw-bar 40, the end of the probe 4 of the cantilever 10, in which the magnetic film 2 and the fine particles or thin film 3 of noble metal (e.g. gold, silver or platinum) or the alloy including noble metal are formed on the surface, is positioned, at a height where the magnetic field signal from the thermal assist type magnetic head device 401 and the near-field light detection signal are maximum, and detected at high resolution.

In this manner, in the second embodiment, the % stage is controlled to change the height of the cantilever in the detection of the write magnetic field from the magnetic field generator 402 and in the detection of the near-field light.

The cantilever 10 is scanned within a range of several 100s nm to several μm in the plane parallel to the recording surface 410 of the head of the raw-bar 40. In the present embodiment, the scanning is performed by moving the raw-bar 40 with the X stage 106 and the Y stage 107.

The fine particles or thin film 3 of noble metal (e.g. gold, silver or platinum) or the alloy including noble metal formed on the magnetic film 2 at the end of the probe 4 generates near-field light with laser emission from the laser source 501. The generated near-field light is scattered on the recording surface 410 of the thermal assist type magnetic head device 401, from the end 41 of the probe 4 of the cantilever 10, by scanning of the raw-bar 40 with the cantilever 10.

Its the degree of scatter of the near-field light differs in accordance with shape of the recording surface 410 of the thermal assist type magnetic head device 401, the way of scattering of the near-field light 505 generated from the end 41 of the probe 4 differs when the probe 4 passes the near-field light emitter 404 and its close vicinity, and the write field generator 402 and its close vicinity, and when the probe 4 passes another flat region on the recording surface 410. By detecting the scattered light SOS with the photo detector 515 to obtain the intensity distribution of the scattered light, it is possible to inspect the surface shapes of the near-field light emitter 404 and the magnetic field generator 402 of the thermal assist type magnetic head device 401 and the positional relation therebetween.

In the present embodiment, the scanning is performed twice in the same region on the recording surface 410 of the head of the raw-bar 40 while the height of the cantilever 10 is changed in the detection of the write magnetic field from the magnetic field generator 402 and in the detection of the near-field light.

It is possible to obtain the positional information of the near-field light emitter 404 from the positional information of the magnetic field generator 402 obtained by the method described in FIG. 7A and the positional relation between the near-field light emitter 404 and the magnetic field generator 402 obtained by the method described in FIG. 7B. According to the present embodiment, it is possible to obtain the positional information of the near-field light emitter 404 even without any unit to cause the near-field light emitter 404 to emit near-field light.

It is advantageous that it is possible to perform inspection of the intensity distribution of the write magnetic field of the thermal assist type magnetic head device, the surface shapes of the write magnetic field generator and the near-field light emitter, and measurement of the positional relationship therebetween, at a stage as early as possible during the manufacturing process.

The probe 4 of the cantilever 10 described in the above first and second embodiments have a pyramid shape or tetrahedral shape, however, the present invention is not limited to this arrangement. As the probe 4, a thin wire member formed of any one of silicone oxide, silicon nitride, high density carbon (HDC:DLC), carbon nano tube (CNT), carbon nano fiber (CNF) and tungsten (W), of quality of material different from that of the lever 1, may be used.

Further, the fine particles or thin film 3 of noble metal (e.g. gold, silver or platinum) or the alloy including noble metal may be formed on the surface of the carbon nano tube or carbon nano fiber as the probe 4 from the front side shown in FIGS. 1B and 2E. Further, as shown in FIG. 2C, it may be formed from the rear side.

Further, the magnetic film 2 is formed in a thin film state on the surface of the probe 4; however, the probe 4 may be doped with a magnetic material.

Further, in the above-described embodiment, the fine particles or thin film 3 of noble metal or the alloy including noble metal is formed on the magnetic film 2 formed on the front side, of the probe 4, however, the present embodiment is not limited to this arrangement. For example, in a case where the probe 4 in which the fine particles or thin film 3 is not formed but only the magnetic film 2 is formed is used, the level of the detection signal is slightly lower in comparison with the above-described embodiment, however, it is possible to receive the laser emitted from the position above the cantilever 10 to generate the near-field light with the magnetic film 2 formed on the front side of the probe 4, and to detect the light scattered from the thermal assist type magnetic head device 401 (scattered light). With this arrangement, it is possible to detect the write magnetic field (alternating current magnetic field) generated from the thermal assist type magnetic head device 401 formed in the raw-bar 40 and the scattered light from the near-field light emitted on the thermal assist type magnetic head device 401, by scanning at once with the cantilever 10.

Note that in the above-described embodiment, the magnetic head device in the raw-bar state is inspected, however, the present invention is not limited to this arrangement. For example, even in a state of chip (slider or head device unit) i.e. each magnetic head device cut out from the raw-bar, it is possible to perform, detection and inspection of both of the scattered light from the near-field light generated, from the magnetic head device and the magnetic field using the thermal assist type magnetic head device inspection apparatus described in the second embodiment.

Third Embodiment

Figure 8A:
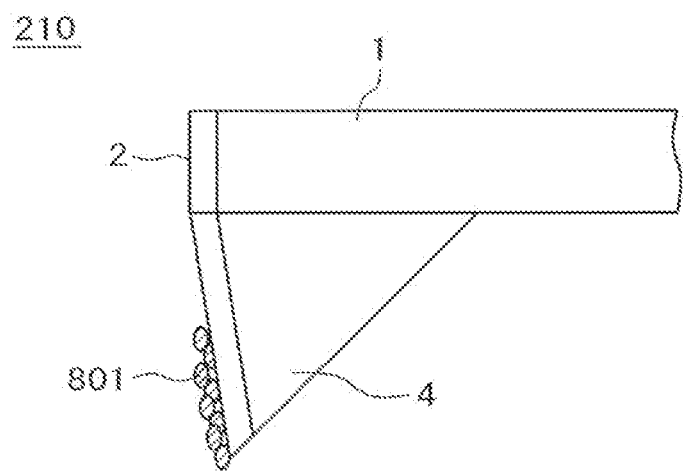
FIG. 8A is a side view showing a schematic structure of a first cantilever capable of detecting both of near-field light and magnetic field according to a third embodiment of the present invention.

Next, a schematic structure of the cantilever 10 according to a third embodiment of the present invention capable of detecting both of near-field light and magnetic field will be described with reference to FIGS. 8A and 8B. FIG. 8A is a side view showing a schematic structure of a cantilever 210 capable of detecting both of near-field light and magnetic field according to the present embodiment, and FIG. 8B, a side view showing a schematic structure of a cantilever 310.

In FIG. 8A, the cantilever 210 capable of detecting both of near-field light and magnetic field has the tetrahedral-structured probe 4 formed at the end of the plate type lever 1. The lever 1 and the probe 4 are formed of silicone (Si). The thin magnetic film 2 (e.g., Co, Ni, Fe, NiFe, CoFe or NiCo) is formed on the front side of the lever 1 and the probe 4. Fine particles or thin film 801 of a material capable of converting light wavelength (fluorescent material (e.g., a ceramics material doped with rare earth ion or a rare earth-barium compound chloride), a material capable of generating a harmonic wave (e.g., paranitroaniline (pNA) or PDA (Poly Diallymethylammonium) nano crystal), or a material causing Raman scattering (e.g., an organic nano crystal such as adenine nano crystal or azobenzene nano crystal, a biomolecule or semiconductor) is formed on the surface of the magnetic film 2. The cantilever 210, having the lever 1, the probe 4, the thin magnetic film 2, and the fine particles or thin film 801 of the material capable of converting light wavelength, capable of detecting both of near-field light and a magnetic field.

Figure 8B:
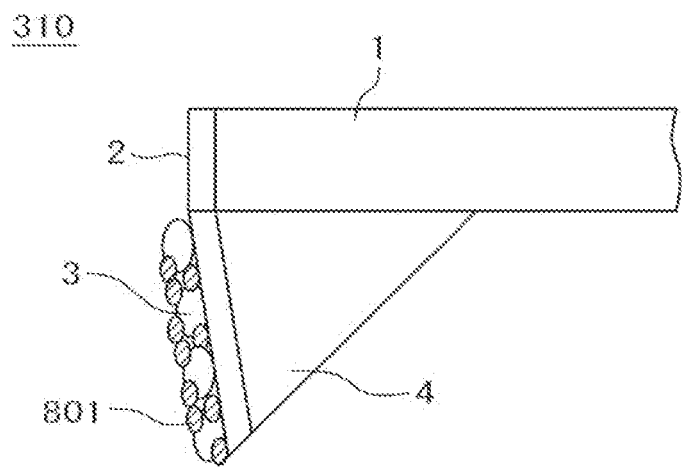
FIG. 8B is a side view showing a schematic structure of a second cantilever capable of detecting both of near-field light and magnetic field according to the third embodiment of the present invention.

In FIG. 8B, the cantilever 310 capable of detecting both of near-field light and magnetic field has the tetrahedral-structured probe 4 formed at the end of the plate type lever 1. The lever 1 and the probe 4 are formed of silicone (Si). The thin magnetic film 2 (e.g., Co, Ni, Fe, NiFe, CoFe or NiCo) is formed on the front side of the lever 1 and the probe 4. The fine particles or thin film 3 of noble metal (e.g. gold, silver or platinum) or the alloy including noble metal is formed on the surface of the magnetic film 2. The fine particles or thin film 801 of the material capable of converting light wavelength (fluorescent material (e.g., a ceramics material doped with rare earth ion or a rare earth-barium, compound chloride), a material capable of generating a harmonic wave (e.g., paranitroaniline (pNA) or PDA (Poly Diallymethylammonium) nano crystal), or a material capable of causing Raman scattering (e.g., an organic nano crystal such as adenine nano crystal or asobenzene nano crystal, a biomolecule or semiconductor) is formed in a gap or surface of the fine particles or thin film 3 of noble metal (e.g. gold, silver or platinum) or the alloy including noble metal. The cantilever 310, having the lever 1, the probe 4, the thin magnetic film 2, the fine particles or thin film 3 of noble metal and the fine particles or thin film 801 of the material capable of converting light wavelength, capable of detecting both of near-field light and magnetic field.

The roles of the respective parts of the cantilever 210 capable of detecting both of near-field light and magnetic field in the present embodiment are as follows.

The cantilever 210 capable of detecting both of near-field light and magnetic field has a similar shape as a cantilever structure as that in a general scanning probe microscope. In the present embodiment, to measure both of near-field light and magnetic field, the thin magnetic film 2, formed on the surface of the probe 4 at the end of the lever 1 of the cantilever 210, determines sensibility and resolution upon detection of magnetic field and senses the magnetic field of a detection subject upon detection of magnetic field. Further, the fine particles or thin film 801 of the material capable of converting light wavelength converts the wavelength of scattered light caused by the near-field light upon emission of the near-field light and striking on the probe 4, to generate scattered light having a wavelength different from that of the near-field light.

The roles of the respective parts of the cantilever 310 capable of detecting both of near-field light and magnetic field in the present embodiment are as follows.

The cantilever 310 capable of detecting both of near-field light and magnetic field has a similar shape as a cantilever structure as that in a general scanning probe microscope. In the present embodiment, to measure both of near-field light and magnetic field, the thin magnetic film 2, formed on the surface of the probe 4 at the end of the lever 1 of the cantilever 310, determines sensibility and resolution upon detection of magnetic field and senses the magnetic field of a detection subject upon detection of magnetic field.

Further, the fine particles or thin film 3 of noble metal (e.g. gold, silver or platinum) or the alloy including noble metal enhances scattered light caused by the near-field light by localized surface plasmon enhancement effect upon emission of the near-field light and striking on the probe 4. Further, the fine particles or thin film 801 of the material capable of converting light wavelength converts the wavelength of scattered light caused by the near-field light, to generate scattered light having a wavelength different from that of the near-field light.

Next, a method for manufacturing the cantilever 310 capable of detecting both of near-field light and magnetic field according to the third embodiment of the present invention will be described with reference to FIGS. 9A to 9C.

Figure 9A:
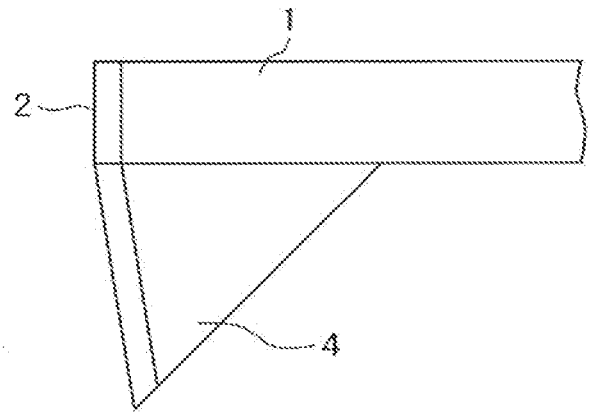
FIG. 9A is a side view of the second cantilever in a state where a thin magnetic film is formed on front surfaces of the cantilever and the probe, explaining the method for manufacturing the second cantilever capable of detecting both of near-field light and magnetic field according to the third embodiment of the present invention.

First, as shown in FIG. 9A, the lever 1 is formed and the tetrahedral-structured probe 4 is formed at the end of the lever 1. Next, the lever 1 and the probe 4 are coated with the magnetic film 2 from the front side of the probe 4. As a unit to perform coating with the magnetic film 2, a vacuum evaporation device or a sputtering device may be used. The amount of formation of the magnetic film (film thickness) is determined based on magnetic field intensity and size of an actual detection subject; and in general, it is 10 nm to 40 nm. As the material of the magnetic body, a soft magnetic material such as Ni, Fe, NiFe, CoFe or NiCo, or a hard magnetic material such as Co, Al—Ni—Co or Fe—Pt may be selected according to detection purpose.

Figure 9B:
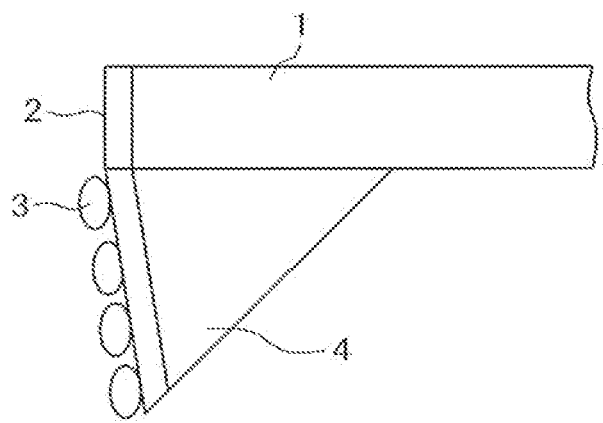
FIG. 9B is a side view of the second cantilever in a state where fine particles of noble metal are attached to the thin magnetic film formed on front surfaces of the cantilever and the probe, explaining the method for manufacturing the second cantilever capable of detecting both of near-field light and magnetic field according to the third embodiment of the present invention.

Next, as shown in FIG. 9B, the fine particles or thin film 3 of noble metal (e.g. gold, silver or platinum) or the alloy including noble metal is formed on the surface of the probe 4 coated with the magnetic film 2, from the front side. Thus the cantilever 10 capable of detecting both of near-field light and magnetic field is completed. The material of the fine particles or thin film 3 is noble metal such as Au, Pt, Cu or Ag, or an alloy material including noble metal. The thickness of the thin film is 1 to 20 nm.

A cantilever 10', as shown in FIG. 2C, a surface where the fine particles or thin film 3 is formed may be added at an angle from diagonally rear two directions. Also in this case, the material of the fine particles or thin film 3 is noble metal such as Au, Pt, Cu or Ag, or an alloy material including noble metal. When the alloy material is a thin film, the film thickness is 1 to 20 nm, while when the alloy material is fine particle, the diameter is 1 to 20 nm.

Figure 9C:
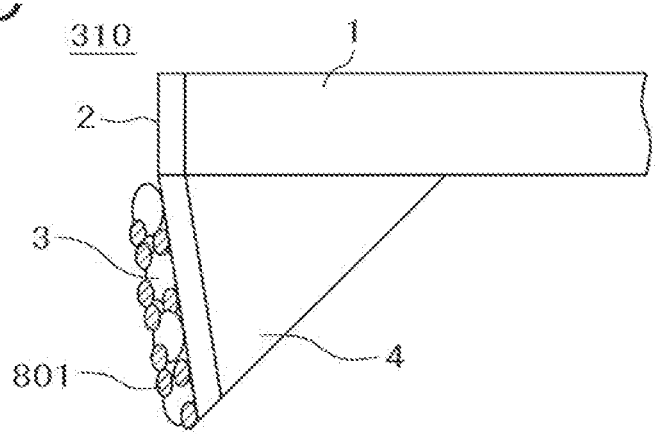
FIG. 9C is a side view of the second cantilever in a state where fine particles of a material capable of converting light wavelength are attached to a gap between the fine particles of noble metal and the thin magnetic film formed, on the front surfaces of the cantilever and the probe, explaining the method for manufacturing the second cantilever capable of detecting both of near-field light and magnetic field according to the third embodiment of the present invention.

Next, as shown in FIG. 9C, the fine particles or thin film 801 of the material capable of converting light wavelength is formed in a gap or surface of the above-described fine particles or thin film 3 of noble metal (e.g. gold, silver or platinum) or the alloy including noble metal. Thus the cantilever 310 capable of detecting both of near-field light and magnetic field is completed. The material of the fine particles or thin film 801 of the material capable of converting light, wavelength is a fluorescent material (e.g., a ceramics material doped with rare earth ion or a rare earth-barium, compound chloride), a material capable of generating a harmonic wave (e.g., paranitroaniline (pNA) or PDA (Polydiallymethylammonium) nano crystal), or a material capable of causing Raman scattering (e.g., an organic nano crystal such as adenine nano crystal or azobenzene nano crystal, a biomolecule or semiconductor). When this material is a thin film, the film thickness is 1 to 20 nm, while when it is fine particle, the diameter is 1 to 20 nm.

The manufacturing method of the cantilever 210 is the same as the manufacturing method of the cantilever 310 except the fine particles or thin film 3 of noble metal (e.g. gold, silver or platinum) or the alloy including noble metal.

Figure 10:
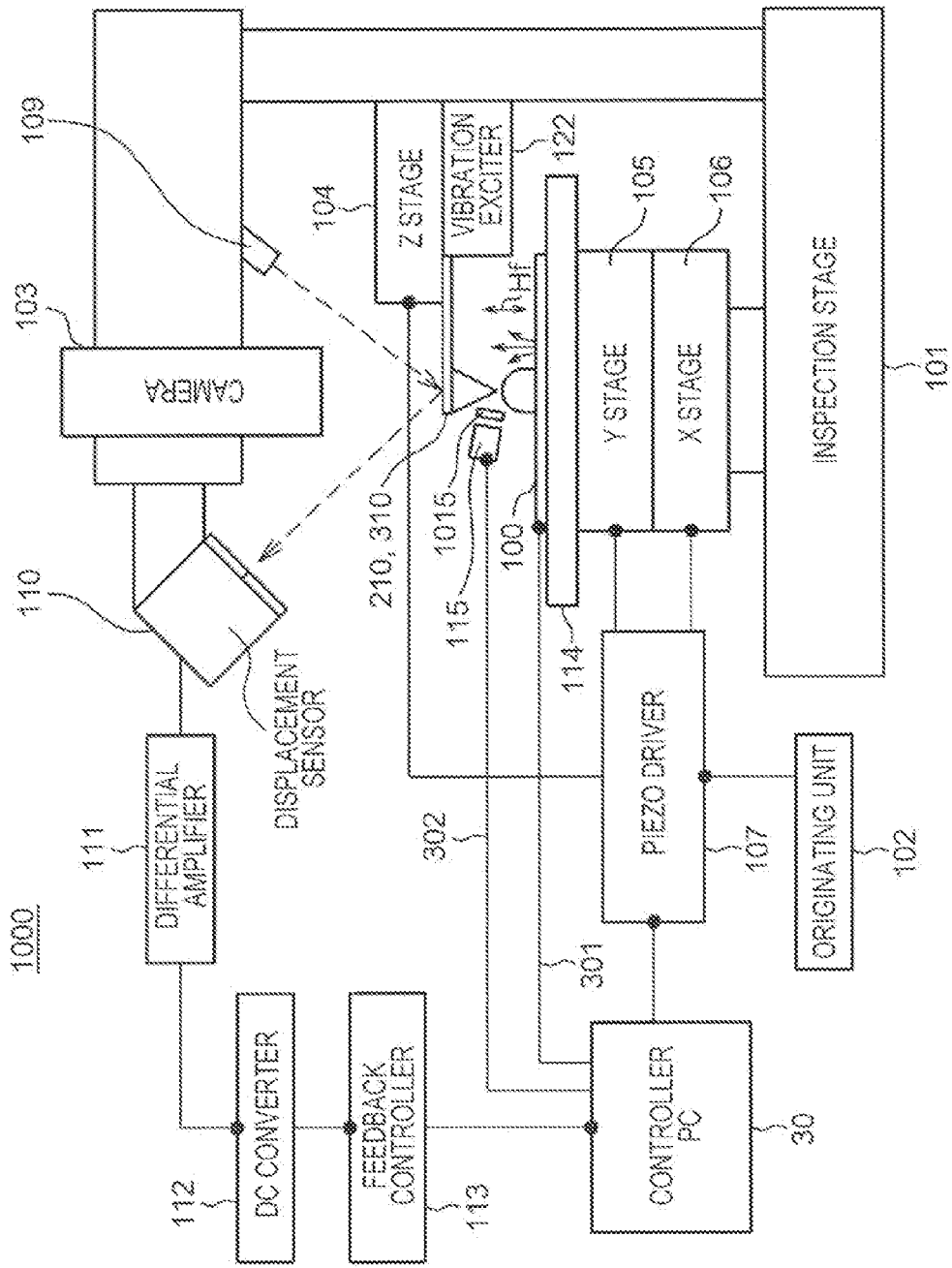
FIG. 10 is a block diagram showing a schematic configuration of the thermal assist type magnetic head, device inspection apparatus according to the third embodiment of the present invention.

FIG. 10 is a block diagram showing a basic configuration of a thermal assist type magnetic head device inspection apparatus 1000 according to the present embodiment. The thermal assist type magnetic head device inspection apparatus 1000 shown in FIG. 10 has the same configuration as that described in the first embodiment using FIGS. 3A and 3B, of the thermal assist type magnetic head device inspection apparatus 100, except that the structures of the cantilevers 210 and 310 and that the detector 115 being provided with a filter 1015. Accordingly, the same parts have the same reference numerals. The explanations of constituent elements corresponding to those in the inspection apparatus described in the first embodiment will be omitted. Further, as the flow of the inspection procedure corresponds to that, described in FIG. 5, the explanation thereof will be omitted.

Figure 11A:
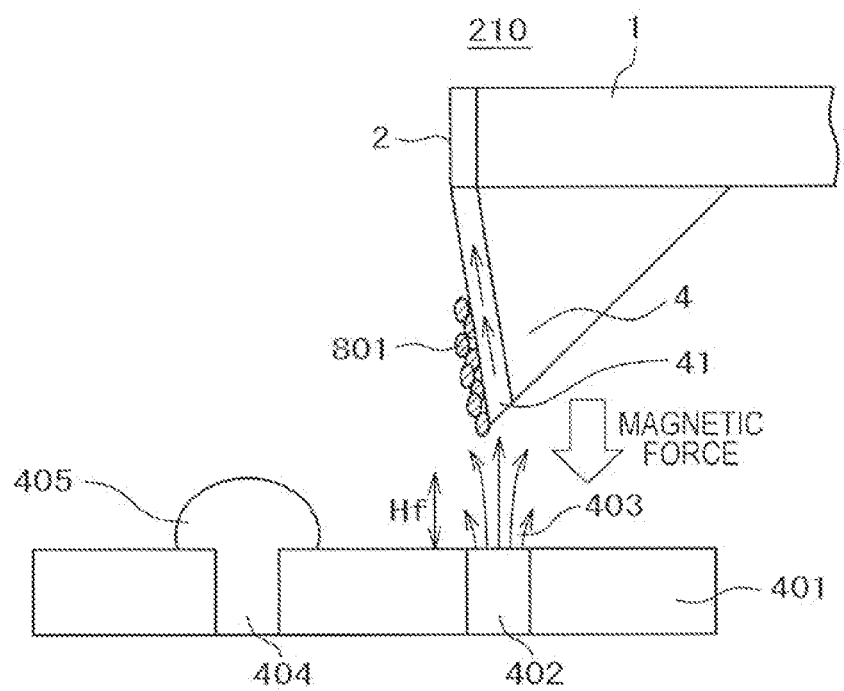
FIG. 11A is a cross-sectional side view of the first cantilever and the raw-bar in a state where the magnetic field generated with the thermal assist type magnetic head device formed in the raw-bar is measured, explaining the detection principle of the thermal assist type magnetic head device inspection apparatus according to the third embodiment of the present invention.
Figure 11B:
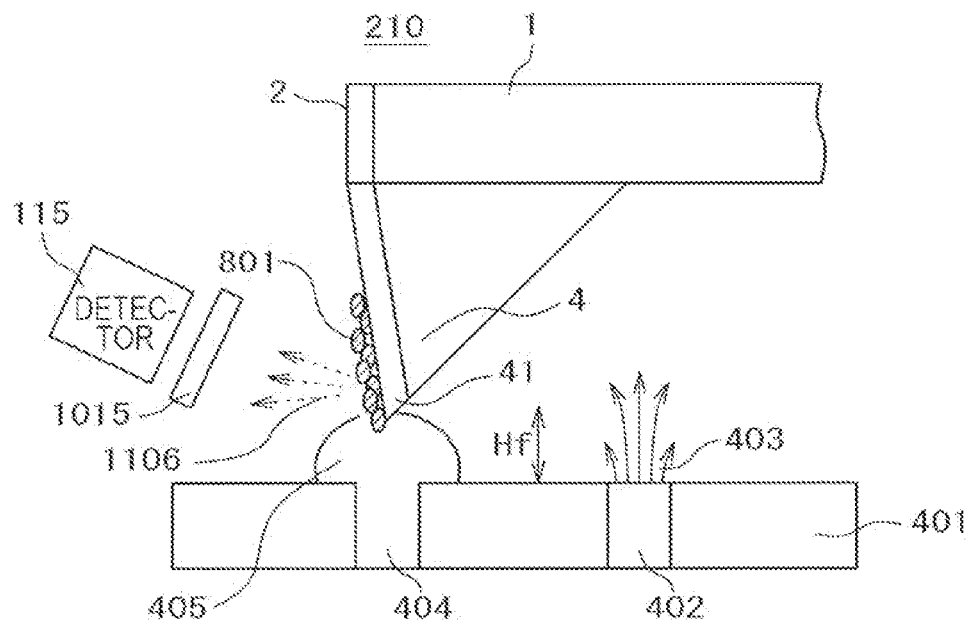
FIG. 11B is a cross-sectional side view of the first cantilever, a detector and the raw-bar in a state where the near-field light generated with the thermal assist type magnetic head device formed in the raw-bar is measured, explaining the detection principle of the thermal assist type magnetic head device inspection apparatus according to the third embodiment of the present invention.

FIGS. 11A and 11B show the outline of the principle of detecting magnetic field and near-field light with the thermal assist type magnetic head device inspection, apparatus 1000 shown in FIG. 10, showing enlarged views of the structures of the write field generator 402 and the thermal assist light (near-field light) emitter 404 of the thermal assist type magnetic head device 401 formed in the raw-bar 40, together with the cantilever 210.

As shown in FIG. 11A, the cantilever 210 is positioned with the Z stage 104 such that, tip to a position (height) several 10 nm away from a state where the undermost point Hf upon vibration is in contact with the surface of the thermal assist type magnetic head device 401 formed in the raw raw-bar 40, the end 41 of the probe 4 of the cantilever 210, where the magnetic film 2 and the fine particles or thin film 801 of the material capable of converting light wavelength of noble metal are formed, is positioned, at a height where a magnetic field signal and a near-field light detection signal from the thermal assist type magnetic head device 401 are maximum, and detected at high resolution. The cantilever 210 is scanned, within a range of several 100s nm to several μm in the plane parallel to the recording surface 410 of the head of the raw-bar 40.

In the present embodiment, the raw-bar 40 is moved with the X stage 106 and the Y stage 107. At this time, the thermal assist type magnetic head device 401 is supplied with the excitation signal and light emission signal 301 outputted from the controller PC 30 or directly supplied with excitation laser shown in FIG. 10, and the write field generator 402 of thermal assist type magnetic head device 401 generates the write magnetic field (alternating current magnetic field) 403, and the near-field light emitter 404 emits thermal assist light (near-field light) 405.

By moving the X stage 106 on which the raw-bar 40 is placed with the piezo device (not shown) controlled with the piezo driver 107 at a constant speed in the X direction in a state where vibration is applied with the vibration exciter 122 to the cantilever 10, when the probe 4 of the cantilever 10, the surface of which the magnetic body 2 and fine particles or thin film 801 of the material capable of converting a wavelength are formed, enters the write magnetic field 403 generated with the write field generator 402, the thin-film magnetic body 2 formed on the surface of the probe 4 is magnetised, then the probe 4 receives a magnetic force, and the vibration state of the cantilever 210 is changed.

The vibration change is detected with the displacement sensor 110 in FIG. 10. That is, when the vibration state of the cantilever 210 is changed, the incident positions of the laser, emitted from the semiconductor laser device 109 and reflected from the cantilever 210, on the divided four photo reception surfaces of the displacement sensor 110, are changed. The output from the displacement sensor 110 is detected with the differential amplifier 111, thus it is possible to detect the change of the vibration state of the cantilever 210. As a result, it is possible to detect the intensity distribution of the write magnetic field 403 generated with the magnetic field generator 402 of the thermal assist type magnetic head device 401.

On the other hand, as shown in FIG. 11B, when the probe 4 enters a region where the near-field light 405 is generated with the near-field light emitter 404 by moving the X stage 106, on which the raw raw-bar 40 is placed, at a constant speed in the X direction in a state where vibration in the vertical direction with respect to the surface 410 of the raw raw-bar 40 is applied with the vibration exciter 122 to the cantilever 210, the wavelength of the scattered light generated by the near-field light 405 is converted by the fine particles or thin film 801 the material capable of converting light wavelength, formed on the magnetic film 2 formed on the surface of the probe 4, and scattered light 1106 having a wavelength different from that of the near-field light is generated. This only-scattered-light 1106 is detected with the photo detector 115 through the filter 1015 provided in the close vicinity of the cantilever 210.

In this manner, it is possible from, the near-field light emitter 404 of the thermal assist type magnetic head device 401 to detect the near-field light generated in the region in the close vicinity of the near-field light emitter 404 in a place comparatively away from the near-field light emitter 404. Further, it is possible to measure the positional relation between the write magnetic field (alternating current magnetic field) 403 generated with the magnetic field generator 402 of the thermal assist type magnetic head device 401 and the thermal assist light (near-field light) 405 generated by the near-field light emitter 404.

Further, in the detection, it is possible to perform high-speed alignment by first detecting the write magnetic field (alternating current magnetic field) 403 generated with the magnetic field generator 402 of the magnetic head device 401 which can be easily detected, and estimating the position of the proximity filed light emitter 404 based on the design information of the head device (common through the first to third embodiments).

It is advantageous that it is possible to perform inspection of the intensity distribution of the write magnetic field of the thermal assist type magnetic head device and the near-field light and measurement of the positional relationship therebetween at a stage as early as possible during the manufacturing process.

Figure 12A:
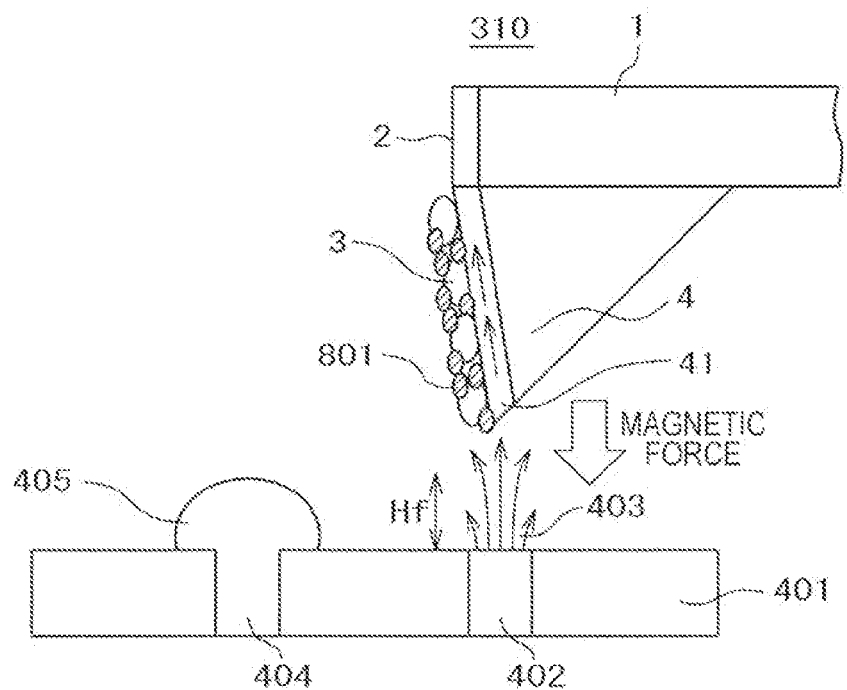
FIG. 12A is a cross-sectional side view of the second cantilever and the raw-bar in a state where the magnetic field generated with thermal assist type magnetic head device formed in the raw-bar is measured, explaining the detection principle of the thermal assist type magnetic head device inspection apparatus according to the third embodiment of the present invention.
Figure 12B:
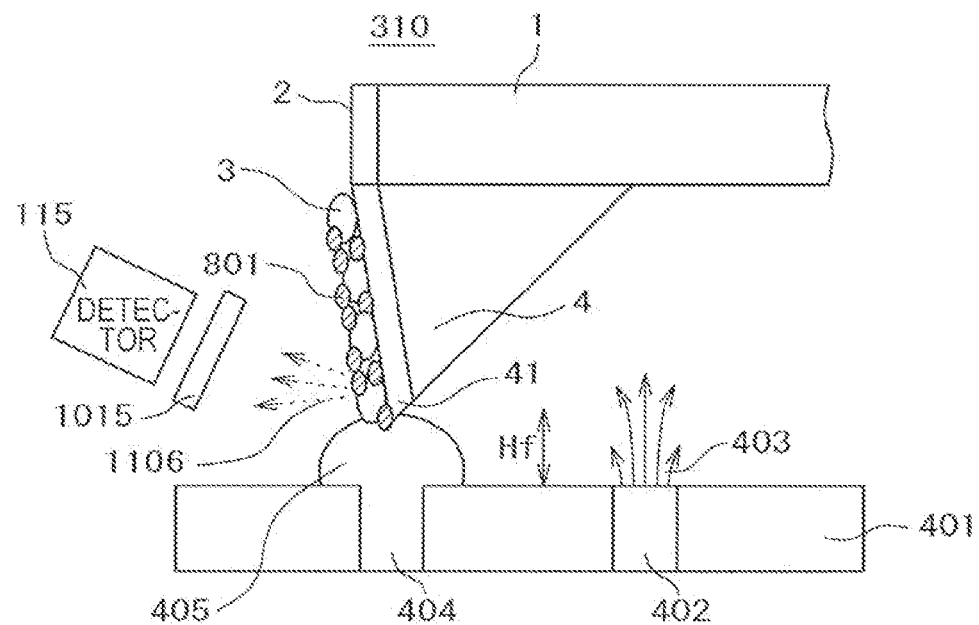
FIG. 12B is a cross-sectional side view of the second cantilever, the detector and the raw-bar, in a state where the near-field light generated with the thermal assist type magnetic head device formed in the raw-bar, explaining the detection principle of the thermal assist type magnetic head device inspection apparatus according to the third embodiment of the present invention.

FIGS. 12A and 12B show the outline of the principle of detecting magnetic field and near-field light with the thermal assist type magnetic head device inspection apparatus 1000 shown in FIG. 10. And they show enlarged views of the structures of the write field generator 402 and the thermal assist light (near-field light) emitter 404 of the thermal assist type magnetic head device 401 formed in the raw-bar 40, together with the cantilever 310.

As shown in FIG. 12A, the cantilever 310 is positioned with the Z stage 104 such that, up to a position (height) several 10s nm away from a state where the undermost point Hf upon vibration is in contact with the surface of the thermal assist type magnetic head device 401 formed in the raw-bar 40, the end 41 of the probe 4 of the cantilever 310, where the magnetic film 2, the fine particles or thin film 3 of noble metal (e.g. gold, silver or platinum) or the alloy including noble metal and the fine particles or thin film 801 of the material capable of converting light wavelength are formed, is positioned, at a height where a magnetic field signal and a near-field light detection signal from the thermal assist type magnetic head device 401 are maximum, and detected at high resolution. The cantilever 310 is scanned within a range of several 100s nm to several μm in the plane parallel to the recording surface 410 of the head of the raw-bar 40.

In the present embodiment, the raw-bar 40 is moved with the X stage 106 and the Y stage 107. At this time, the thermal assist type magnetic head device 401 is supplied with the excitation signal and light emission signal 301 or directly supplied with excitation laser outputted from the controller PC 30 shown in FIG. 10.

and the write field generator 402 of thermal assist type magnetic head device 401 generates the write magnetic field (alternating current magnetic field) 403, and the near-field light emitter 404 emits the thermal assist light (near-field light) 405.

When the probe 4 of the cantilever 310, the surface of which the magnetic body 2, the fine particles or thin film 3 of noble metal (e.g. gold, silver or platinum) or the alloy including noble metal and the fine particles or thin film 801 of the material capable of converting a wavelength are formed, enters the write magnetic field 403 generated by the write field generator 402 by moving the X stage 106 on which the raw-bar 40 is placed with the piezo device (not shown) controlled with the piezo driver 107 at a constant speed in the X direction in a state where vibration is applied with the vibration, exciter 122 to the cantilever 310, the thin-film magnetic body 2 formed on the surface of the probe 4 is magnetised, then the probe 4 receives a magnetic force, and the vibration state of the cantilever 310 is changed.

The vibration change is detected with the displacement sensor 110 in FIG. 10. That is, when the vibration state of the cantilever 310 is changed, the incident positions of the laser, emitted from the semiconductor laser device 103 and reflected from the cantilever 310, on the divided four photo reception surfaces of the displacement sensor 110, are changed. The output from the displacement sensor 110 is detected with the differential amplifier 111, thus it is possible to detect the change of the vibration state of the cantilever 310. As a result, it is possible to detect the intensity distribution of the write magnetic field 403 generated from the magnetic field generator 402 of the thermal assist type magnetic head device 401.

On the other hand, as shown in FIG. 12B, when the probe 4 enters a region where the near-field light 405 is generated by the near-field, light emitter 404 by moving the X stage 106 on which the raw-bar 40 is placed at a constant speed iii the X direction in a state where vibration in the vertical direction with respect to the surface 410 of the raw-bar 40 is applied with the vibration exciter 122 to the cantilever 310, the scattered light 406 generated by the near-field light 405 is enhanced by the localized surface plasmon enhancement effect with the fine particles or thin film 3 of noble metal (e.g. gold, silver or platinum) or the alloy including noble metal formed on the magnetic film 2 on the surface of the probe 4. Further, the wavelength of the enhanced scattered light generated by the near-field light is converted with the fine particles or thin film 801 of the material capable of converting light wavelength, formed in a gap or surface of the fine particles or thin film 3 of noble metal (e.g. gold, silver or platinum) or the alloy including noble metal, and scattered light having a wavelength different from that of the near-field light is generated. This only-scattered-light 1106 is detected with the photo detector 115 through the filter 1015 provided in the close vicinity of the cantilever 310.

In this manner, it is possible to detect the near-field light generated in the region in the close vicinity of the near-field light emitter 404 from the near-field light emitter 404 of the thermal assist type magnetic head device 401 in a place comparatively away from the near-field light, emitter 404. Further, it is possible to measure the positional relation between the write magnetic field (alternating current magnetic field) 403 generated by the magnetic field generator 402 of the thermal assist type magnetic head, device 401 and the thermal assist light (near-field light) 405 generated by the near-field light emitter 404.

Further, in the detection, it is possible to perform high-speed alignment by first detecting the write magnetic field (alternating current magnetic field) 403 generated by the magnetic field generator 402 of the magnetic head device 401 which can be easily detected, and estimating the position of the proximity near-field light emitter 404 based on the design information of the head device. This is the same advantage through the first to third embodiments.

It is advantageous that it is possible to perform inspection of the intensity distribution of the write magnetic field of the thermal assist type magnetic head device and the near-field, light, and measurement of the positional relationship therebetween at a stage as early as possible during the manufacturing process.

Note that in the above-described embodiment, the fine particles or thin film 3 of noble metal or the alloy including noble metal is formed on the magnetic film 2 formed on the front side of the probe 4, and the fine particles or thin film 801 of the material capable of converting light wavelength is formed thereon. However, the present embodiment is not limited to this arrangement. For example, when the probe 4 in which the fine particles or thin film 801 of the material capable of converting light wavelength is formed is directly formed on the magnetic film 2 without forming the fine particles or thin film 3, the level of the detection signal is slightly lower in comparison with the above-described embodiment, however, it is possible to detect the scattered light generated from the probe 4 by the near-field light generated from the thermal assist type magnetic head device 401. With this arrangement, it is possible to detect the write magnetic field (alternating current magnetic field) generated from the thermal assist type magnetic head device 401 formed in the raw-bar 40 and the scattered light from the near-field light generated from the thermal assist type magnetic head device 401, by scanning at once with the cantilever 10.

Note that in the above-described embodiments, the magnetic head device is inspected in the raw-bar state; however, the present invention is not limited to this arrangement. For example, even in a state of chip (slider or head device unit) i.e. each magnetic head device cut out from the raw-bar, it is possible to perform detection and inspection of both of scattered light and magnetic field by using the thermal assist type magnetic head device inspection apparatus 1000.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description and sail changes which come within the meaning and range of equivalency of the claims are therefore intended to be embraced therein.

The invention claimed is:

1. An inspection apparatus for inspecting a thermal assist type magnetic head device, comprising:
    a table unit that is movable in a plane while carrying the thermal assist type magnetic head device as a sample;
    a cantilever, having a probe with a magnetic film formed on its surface, to scan a surface of a sample placed on the table unit;
    a vibration drive unit that vibrates the cantilever in a vertical direction with respect to the surface of the sample;
    a displacement detection unit that emits light on a surface of the cantilever, vibrated with the vibration drive unit, opposite to a side where the probe is formed, to detect reflection light from the cantilever, so as to detect vibration of the cantilever;
    a signal output unit that outputs a signal to generate an alternating current magnetic field from a magnetic field generator of the thermal assist type magnetic head device and to generate near-field light from a near-field light emitter;
    a scattered light detection unit that detects scattered light generated from the surface of the probe of the cantilever, on which the magnetic film is formed, caused by the near-field light generated from the near-field light emitter of the thermal assist type magnetic head device with the signal outputted from the signal output unit; and
    a processing unit that processes the signal obtained by the detection of the displacement with the displacement detection unit and the signal obtained by the detection of the scattered light with the scattered light detection unit, and inspects at least one of the intensity distribution of the near-field light generated from the near-field light emitter of the thermal assist type magnetic head device, the surface shape of the near-field light emitter, and the positional relation between the magnetic field generator and the near-field light emitter.

2. The inspection apparatus for inspecting the thermal assist type magnetic head device according to claim 1,
    wherein in the probe of the cantilever, fine particles or thin film of noble metal or an alloy including noble metal is formed on the surface of the magnetic film, and
    wherein the scattered light is generated from the fine particles or thin film of noble metal or an alloy including noble metal caused by the near-field light by moving the probe in the close vicinity of the surface of the sample from which the near-field light is generated.

3. The inspection apparatus for inspecting the thermal assist type magnetic head device according to claim 1,
    wherein fine particles or thin film of a material to convert incident light wavelength and emit the wavelength converted light is formed on the magnetic film formed on the surface of the probe of the cantilever, and
    wherein the scattered light having a wavelength different from that of the near-field light is generated from the fine particles or thin film of the material to convert incident light wavelength and emit the wavelength converted light, from the scattered light generated from the magnetic film on the surface of the probe, by moving the probe in the close vicinity of the surface of the sample from which the near-field light is generated.

4. The inspection apparatus for inspecting the thermal assist type magnetic head device according to claim 1,
    wherein fine particles or thin film of noble metal or an alloy including noble metal is formed on the magnetic film formed on the surface of the probe of the cantilever,
    wherein fine particles or thin film of a material to convert incident light wavelength and emit the wavelength converted light is formed on the fine particles or thin film of noble metal or the alloy including noble metal,
    wherein the scattered light having a wavelength different from that of the near-field light is generated by conversion of the wavelength of the scattered light generated from the fine particles or thin film of noble metal or the alloy including noble metal formed in the probe, by moving the probe in the close vicinity of the surface of the sample from which the near-field light is generated, with the fine particles or thin film of the material to convert incident light wavelength and emit the wavelength converted light, and
    wherein the generated scattered light is detected by the scattered light detection unit.

5. An inspection apparatus for inspecting a thermal assist type magnetic head device, comprising:

a table unit that is movable in a plane while carrying the thermal assist type magnetic head device as a sample;

a cantilever, having a probe with a magnetic film formed on its surface, to scan a surface of a sample placed on the table unit;

a vibration drive unit that vibrates the cantilever in a vertical direction with respect to the surface of the sample;

a displacement detection unit that emits light on a surface of the cantilever, vibrated with the vibration drive unit, opposite to a side where the probe is formed, to detect reflection light from the cantilever, so as to detect vibration of the cantilever;

a signal output unit that outputs a signal to generate an alternating current magnetic field from a magnetic field generator of the sample;

a laser emission unit that emits laser on the cantilever;

a scattered light detection unit that detects scattered light generated from the surface of the sample caused by near-field light generated from the probe of the cantilever on which the laser is emitted with the laser emission unit; and a processing unit that processes the signal obtained by the detection of the displacement with the displacement detection unit and the signal obtained by the detection of the scattered light generated from the surface of the sample with the scattered light detection unit, and inspects at least one of the surface shape of the sample which generated the scattered light and the positional relation between the magnetic field generator and a near-field light emitter.

6. The inspection apparatus for inspecting the thermal assist type magnetic head device according to claim 5, wherein the probe of the cantilever, with a magnetic film formed on its surface, and with fine particles or thin film of noble metal or an alloy including noble metal formed on the surface of the magnetic film, generates the near-field light with the fine particles or thin film of noble metal or the alloy including noble metal, with the laser emitted from the laser emission unit.

7. The inspection apparatus for inspecting the thermal assist type magnetic head device according to claim 5, wherein the probe of the cantilever is formed of a thin wire member formed of any one of silicon oxide, silicon nitride, high density carbon (HDC:DLC), carbon nano tube (CRT), carbon nano fiber (CNF) and tungsten (W).

8. A method for inspecting a thermal assist type magnetic head device comprising the steps of:

placing the thermal assist type magnetic head device as a sample on a table that is movable in a plane of a scanning probe microscope apparatus;

generating an alternating current magnetic field from a magnetic field generator of the sample and generating near-field light from a near-field light emitter;

detecting the alternating current magnetic field generated from the thermal assist type magnetic head device and scattered light caused by the near-field light by moving the table in the plane in a state where the cantilever of the scanning probe microscope, having a probe with a magnetic film formed its surface, is vibrated vertically in the close vicinity of a surface of the sample; and inspecting at least one of the intensity distribution of the near-field light emitted from, the near-field light emitter of the thermal assist type magnetic head device, the surface shape of the near-field light emitter and the positional relation between the magnetic field generator and the near-field light emitter, using occurrence position information of the detected alternating current magnetic field and occurrence position information of the near-field light based on the detected scattered light.

9. The method for inspecting the thermal assist type magnetic head device according to claim 8, wherein fine particles or thin film of noble metal or an alloy including noble metal is formed on the surface of the magnetic film of the probe of the vertically vibrated cantilever, and wherein information on the intensity distribution of the near-field light, the surface shape of the near-field light emitter and the positional relation between the magnetic field generator and the near-field light emitter is obtained, by moving the probe in the close vicinity of the near-field light generated from the near-field light emitter of the thermal assist type magnetic head device to generate scattered light enhanced with the fine particles or thin film formed on the probe and detecting the enhanced scattered light.

10. The method for inspecting the thermal assist type magnetic head device according to claim 8, wherein fine particles or thin film, of a material to convert incident light wavelength and emit the light is formed on the surface of the magnetic film on the probe of the vertically vibrated cantilever, wherein scattered light having a wavelength different from that of the near-field light from the fine particles or thin film formed on the probe by moving the probe in the close vicinity of the near-field light is generated from the near-field light emitter of the thermal assist type magnetic head device, and wherein information on the intensity distribution of the near-field light, the surface shape of the near-field light emitter and the positional relation between the magnetic field generator and the near-field light emitter is obtained by detecting the scattered light.

11. The method for inspecting the thermal assist type magnetic head device according to claim 8, wherein fine particles or thin film of noble metal or an alloy including noble metal is formed on the surface of the magnetic film of the probe of the vertically vibrated cantilever, wherein fine particles or thin film of a material to convert incident light wavelength and emit the wavelength converted light is formed on the fine particles or thin film, wherein scattered light enhanced with the fine particles or thin film formed on the probe is generated by moving the probe in the close vicinity of the near-field light generated from the near-field light emitter of the thermal assist type magnetic head device, wherein the wavelength of the generated scattered light is converted with the fine particles or thin film of the material to convert incident light wavelength and the wavelength converted scattered light is emitted, and wherein information on the intensity distribution of the near-field light, the surface shape of the near-field light emitter and the positional relation between the magnetic field generator and the near-field light emitter is obtained by detecting the wavelength-converted scattered light.

12. A method for inspecting a thermal assist type magnetic head device, comprising the steps of;

placing the thermal assist type magnetic head device as a sample on a table that is movable in a plane of a scanning probe microscope apparatus;

generating an alternating current magnetic field from a magnetic field generator of the sample and emitting laser on a cantilever of the scanning probe microscope apparatus having a probe with a magnetic film formed on its surface to generate near-field light from the probe;

detecting the alternating current magnetic field generated from the thermal assist type magnetic head device by moving the table in the plane in a state where the cantilever is vertically vibrated in the close vicinity of the surface of the sample and detecting scattered light generated from the thermal assist type magnetic head device in the close vicinity of the generated near-field light; and inspecting the surface shapes of the magnetic field generator and the near-field light emitter of the sample and the positional relation between the magnetic field generator and the near-field light emitter using occurrence position information of the detected alternating current magnetic field and detection information of the scattered light generated with the near-field light.

13. The method for inspecting the thermal assist type magnetic head device according to claim 12, wherein fine particles or thin film of noble metal or an alloy including noble metal is formed on the surface of the magnetic film on the probe of the vertically vibrated cantilever, and wherein the near-field light is generated from the fine particles or thin film of noble metal or the alloy including noble metal by emitting the laser on the cantilever.

14. The method for inspecting the thermal assist type magnetic head device according to claim 12, wherein positional information of the magnetic field generator is obtained by detecting a change of vibration of the cantilever influenced by the alternating current magnetic field when the magnetic film formed on the surface of the probe of the vertically vibrated cantilever passes through the alternating current magnetic field generated with the magnetic field generator of the thermal assist type magnetic head device.

* * * * *